(12) United States Patent
Bae et al.

(10) Patent No.: US 12,539,145 B2
(45) Date of Patent: Feb. 3, 2026

(54) ACOUSTIC REPORTING FOR DYNAMIC IMPLANTS

(71) Applicant: Nuvasive Specialized Orthopedics, Inc., San Diego, CA (US)

(72) Inventors: Youngsam Bae, Placentia, CA (US); Michael Moeller, Carlsbad, CA (US); Shanbao Cheng, Rancho Santa Margarita, CA (US); Everett Van Zuiden, Chula Vista, CA (US); Edgar Hernandez, Los Angeles, CA (US); Luke Bilger, Honolulu, HI (US); Khoa Pham, Menominie Falls, WI (US)

(73) Assignee: NuVasive Specialized Orthopedics, Inc., San Diego, CA (US)

( * ) Notice: Subject to any disclaimer, the term of this patent is extended or adjusted under 35 U.S.C. 154(b) by 1010 days.

(21) Appl. No.: 17/753,379

(22) PCT Filed: Aug. 26, 2020

(86) PCT No.: PCT/US2020/048002
§ 371 (c)(1),
(2) Date: Mar. 1, 2022

(87) PCT Pub. No.: WO2021/045946
PCT Pub. Date: Mar. 11, 2021

(65) Prior Publication Data
US 2022/0273343 A1 Sep. 1, 2022

Related U.S. Application Data

(60) Provisional application No. 62/895,391, filed on Sep. 3, 2019.

(51) Int. Cl.
*A61B 17/66* (2006.01)
*A61B 17/70* (2006.01)
(Continued)

(52) U.S. Cl.
CPC ...... *A61B 17/7016* (2013.01); *A61B 17/7216* (2013.01); *A61B 17/8858* (2013.01); *A61B 2017/00402* (2013.01)

(58) Field of Classification Search
CPC ..... A61B 17/68; A61B 17/70; A61B 17/7002; A61B 17/7014; A61B 17/7016;
(Continued)

(56) References Cited

U.S. PATENT DOCUMENTS 2,702,031 A 2/1955 Wenger
3,111,945 A 11/1963 Solbrig
(Continued)

FOREIGN PATENT DOCUMENTS

CN 1697630 A 11/2005
CN 101040807 A 9/2007
(Continued)

OTHER PUBLICATIONS

Abe et al., "Experimental external fixation combined with percutaneous discectomy in the management of scoliosis.", SPINE, 1999, pp. 646-653, 24, No. 7.
(Continued)

*Primary Examiner* — Jacqueline T Johanas
*Assistant Examiner* — Christina Negrellirodriguez

(57) ABSTRACT

This disclosure concerns devices and methods for measuring an amount of adjustment of an expandable implant using ultrasound. The implant may include an ultrasound counter including a vibration element tuned for ultrasonic vibration, the vibration element may be configured to produce an ultrasound vibration upon an adjustment of the expandable implant.

14 Claims, 10 Drawing Sheets

(51) Int. Cl.
*A61B 17/72* (2006.01)
*A61B 17/88* (2006.01)
*A61B 17/00* (2006.01)

(58) Field of Classification Search
CPC ............... A61B 17/72; A61B 17/7216; A61B 2017/681; A61B 17/66; A61N 7/00
USPC ................. 623/17.11–17.16; 606/60, 62, 63
See application file for complete search history.

(56) References Cited

U.S. PATENT DOCUMENTS

| | | | |
|---|---|---|---|
| 3,372,476 | A | 3/1968 | Peiffer |
| 3,377,576 | A | 4/1968 | Langberg |
| 3,512,901 | A | 5/1970 | Law |
| 3,597,781 | A | 8/1971 | Eibes |
| 3,900,025 | A | 8/1975 | Barnes, Jr. |
| 3,915,151 | A | 10/1975 | Kraus |
| RE28,907 | E | 7/1976 | Eibes et al. |
| 3,976,060 | A | 8/1976 | Hildebrandt et al. |
| 4,010,758 | A | 3/1977 | Rockland et al. |
| 4,056,743 | A | 11/1977 | Clifford et al. |
| 4,068,821 | A | 1/1978 | Morrison |
| 4,078,559 | A | 3/1978 | Nissinen |
| 4,204,541 | A | 5/1980 | Kapitanov |
| 4,357,946 | A | 11/1982 | Dutcher et al. |
| 4,386,603 | A | 6/1983 | Mayfield |
| 4,448,191 | A | 5/1984 | Rodnyansky et al. |
| 4,486,176 | A | 12/1984 | Tardieu et al. |
| 4,501,266 | A | 2/1985 | McDaniel |
| 4,522,501 | A | 6/1985 | Shannon |
| 4,537,520 | A | 8/1985 | Ochiai et al. |
| 4,550,279 | A | 10/1985 | Klein |
| 4,561,798 | A | 12/1985 | Elcrin et al. |
| 4,573,454 | A | 3/1986 | Hoffman |
| 4,592,355 | A | 6/1986 | Antebi |
| 4,595,007 | A | 6/1986 | Mericle |
| 4,642,257 | A | 2/1987 | Chase |
| 4,658,809 | A | 4/1987 | Ulrich et al. |
| 4,700,091 | A | 10/1987 | Wuthrich |
| 4,747,832 | A | 5/1988 | Buffet |
| 4,854,304 | A | 8/1989 | Zielke |
| 4,904,861 | A | 2/1990 | Epstein et al. |
| 4,931,055 | A | 6/1990 | Bumpus et al. |
| 4,940,467 | A | 7/1990 | Tronzo |
| 4,957,495 | A | 9/1990 | Kluger |
| 4,973,331 | A | 11/1990 | Pursley et al. |
| 5,010,879 | A | 4/1991 | Moriya et al. |
| 5,030,235 | A | 7/1991 | Campbell, Jr. |
| 5,041,112 | A | 8/1991 | Mingozzi et al. |
| 5,064,004 | A | 11/1991 | Lundell |
| 5,074,882 | A | 12/1991 | Grammont et al. |
| 5,092,889 | A | 3/1992 | Campbell, Jr. |
| 5,133,716 | A | 7/1992 | Plaza |
| 5,142,407 | A | 8/1992 | Varaprasad et al. |
| 5,156,605 | A | 10/1992 | Pursley et al. |
| 5,263,955 | A | 11/1993 | Baumgart et al. |
| 5,290,289 | A | 3/1994 | Sanders et al. |
| 5,306,275 | A | 4/1994 | Bryan |
| 5,330,503 | A | 7/1994 | Yoon |
| 5,334,202 | A | 8/1994 | Carter |
| 5,336,223 | A | 8/1994 | Rogers |
| 5,356,411 | A | 10/1994 | Spievack |
| 5,356,424 | A | 10/1994 | Buzerak et al. |
| 5,364,396 | A | 11/1994 | Robinson et al. |
| 5,403,322 | A | 4/1995 | Herzenberg et al. |
| 5,429,638 | A | 7/1995 | Muschler et al. |
| 5,437,266 | A | 8/1995 | McPherson et al. |
| 5,466,261 | A | 11/1995 | Richelsoph |
| 5,468,030 | A | 11/1995 | Walling |
| 5,480,437 | A | 1/1996 | Draenert |
| 5,509,888 | A | 4/1996 | Miller |
| 5,516,335 | A | 5/1996 | Kummer et al. |
| 5,527,309 | A | 6/1996 | Shelton |
| 5,536,269 | A | 7/1996 | Spievack |
| 5,549,610 | A | 8/1996 | Russell et al. |
| 5,573,012 | A | 11/1996 | McEwan |
| 5,575,790 | A | 11/1996 | Chen et al. |
| 5,582,616 | A | 12/1996 | Bolduc et al. |
| 5,620,445 | A | 4/1997 | Brosnahan et al. |
| 5,620,449 | A | 4/1997 | Faccioli et al. |
| 5,626,579 | A | 5/1997 | Muschler et al. |
| 5,626,613 | A | 5/1997 | Schmieding |
| 5,632,744 | A | 5/1997 | Campbell, Jr. |
| 5,659,217 | A | 8/1997 | Petersen |
| 5,662,683 | A | 9/1997 | Kay |
| 5,672,175 | A | 9/1997 | Martin |
| 5,672,177 | A | 9/1997 | Seldin |
| 5,700,263 | A | 12/1997 | Schendel |
| 5,704,938 | A | 1/1998 | Staehlin et al. |
| 5,704,939 | A | 1/1998 | Justin |
| 5,720,746 | A | 2/1998 | Soubeiran |
| 5,743,910 | A | 4/1998 | Bays et al. |
| 5,762,599 | A | 6/1998 | Sohn |
| 5,771,903 | A | 6/1998 | Jakobsson |
| 5,810,815 | A | 9/1998 | Morales |
| 5,827,286 | A | 10/1998 | Incavo et al. |
| 5,830,221 | A | 11/1998 | Stein et al. |
| 5,879,375 | A | 3/1999 | Larson, Jr. et al. |
| 5,902,304 | A | 5/1999 | Walker et al. |
| 5,935,127 | A | 8/1999 | Border |
| 5,945,762 | A | 8/1999 | Chen et al. |
| 5,961,553 | A | 10/1999 | Coty et al. |
| 5,976,138 | A | 11/1999 | Baumgart et al. |
| 5,979,456 | A | 11/1999 | Magovern |
| 6,022,349 | A | 2/2000 | McLeod et al. |
| 6,033,412 | A | 3/2000 | Losken et al. |
| 6,034,296 | A | 3/2000 | Elvin et al. |
| 6,102,922 | A | 8/2000 | Jakobsson et al. |
| 6,106,525 | A | 8/2000 | Sachse |
| 6,126,660 | A | 10/2000 | Dietz |
| 6,126,661 | A | 10/2000 | Faccioli et al. |
| 6,138,681 | A | 10/2000 | Chen et al. |
| 6,139,316 | A | 10/2000 | Sachdeva et al. |
| 6,162,223 | A | 12/2000 | Orsak et al. |
| 6,183,476 | B1 | 2/2001 | Gerhardt et al. |
| 6,200,317 | B1 | 3/2001 | Aalsma et al. |
| 6,234,956 | B1 | 5/2001 | He et al. |
| 6,241,730 | B1 | 6/2001 | Alby |
| 6,245,075 | B1 | 6/2001 | Betz et al. |
| 6,315,784 | B1 | 11/2001 | Djurovic |
| 6,319,255 | B1 | 11/2001 | Grundei et al. |
| 6,331,744 | B1 | 12/2001 | Chen et al. |
| 6,336,929 | B1 | 1/2002 | Justin |
| 6,343,568 | B1 | 2/2002 | McClasky |
| 6,358,283 | B1 | 3/2002 | Hogfors et al. |
| 6,375,682 | B1 | 4/2002 | Fleischmann et al. |
| 6,389,187 | B1 | 5/2002 | Greenaway et al. |
| 6,400,980 | B1 | 6/2002 | Lemelson |
| 6,402,753 | B1 | 6/2002 | Cole et al. |
| 6,409,175 | B1 | 6/2002 | Evans et al. |
| 6,416,516 | B1 | 7/2002 | Stauch et al. |
| 6,499,907 | B1 | 12/2002 | Baur |
| 6,500,110 | B1 | 12/2002 | Davey et al. |
| 6,508,820 | B2 | 1/2003 | Bales |
| 6,510,345 | B1 | 1/2003 | Van Bentem |
| 6,537,196 | B1 | 3/2003 | Creighton, IV et al. |
| 6,554,831 | B1 | 4/2003 | Rivard et al. |
| 6,565,573 | B1 | 5/2003 | Ferrante et al. |
| 6,565,576 | B1 | 5/2003 | Stauch et al. |
| 6,582,313 | B2 | 6/2003 | Perrow |
| 6,583,630 | B2 | 6/2003 | Mendes et al. |
| 6,616,669 | B2 | 9/2003 | Ogilvie et al. |
| 6,626,917 | B1 | 9/2003 | Craig |
| 6,656,135 | B2 | 12/2003 | Zogbi et al. |
| 6,656,194 | B1 | 12/2003 | Gannoe et al. |
| 6,667,725 | B1 | 12/2003 | Simons et al. |
| 6,673,079 | B1 | 1/2004 | Kane |
| 6,702,816 | B2 | 3/2004 | Buhler |
| 6,706,042 | B2 | 3/2004 | Taylor |
| 6,709,293 | B2 | 3/2004 | Mori et al. |
| 6,730,087 | B1 | 5/2004 | Butsch |
| 6,761,503 | B2 | 7/2004 | Breese |
| 6,769,499 | B2 | 8/2004 | Cargill et al. |

(56) References Cited

U.S. PATENT DOCUMENTS

| | | |
|---|---|---|
| 6,789,442 B2 | 9/2004 | Forch |
| 6,796,984 B2 | 9/2004 | Soubeiran |
| 6,802,844 B2 | 10/2004 | Ferree |
| 6,809,434 B1 | 10/2004 | Duncan et al. |
| 6,835,207 B2 | 12/2004 | Zacouto et al. |
| 6,852,113 B2 | 2/2005 | Nathanson et al. |
| 6,918,838 B2 | 7/2005 | Schwarzler et al. |
| 6,918,910 B2 | 7/2005 | Smith et al. |
| 6,921,400 B2 | 7/2005 | Sohngen |
| 6,923,951 B2 | 8/2005 | Contag et al. |
| 6,971,143 B2 | 12/2005 | Domroese |
| 7,001,346 B2 | 2/2006 | White |
| 7,008,425 B2 | 3/2006 | Phillips |
| 7,011,658 B2 | 3/2006 | Young |
| 7,029,472 B1 | 4/2006 | Fortin |
| 7,029,475 B2 | 4/2006 | Panjabi |
| 7,041,105 B2 | 5/2006 | Michelson |
| 7,060,080 B2 | 6/2006 | Bachmann |
| 7,063,706 B2 | 6/2006 | Wittenstein |
| 7,105,029 B2 | 9/2006 | Doubler et al. |
| 7,105,968 B2 | 9/2006 | Nissen |
| 7,114,501 B2 | 10/2006 | Johnson et al. |
| 7,115,129 B2 | 10/2006 | Heggeness |
| 7,135,022 B2 | 11/2006 | Kosashvili et al. |
| 7,160,312 B2 | 1/2007 | Saadat |
| 7,163,538 B2 | 1/2007 | Altarac et al. |
| 7,189,005 B2 | 3/2007 | Ward |
| 7,191,007 B2 | 3/2007 | Desai et al. |
| 7,218,232 B2 | 5/2007 | DiSilvestro et al. |
| 7,238,191 B2 | 7/2007 | Bachmann |
| 7,241,300 B2 | 7/2007 | Sharkawy et al. |
| 7,243,719 B2 | 7/2007 | Baron et al. |
| 7,255,682 B1 | 8/2007 | Bartol, Jr. et al. |
| 7,282,023 B2 | 10/2007 | Frering |
| 7,285,087 B2 | 10/2007 | Moaddeb et al. |
| 7,302,015 B2 | 11/2007 | Kim et al. |
| 7,302,858 B2 | 12/2007 | Walsh et al. |
| 7,314,443 B2 | 1/2008 | Jordan et al. |
| 7,333,013 B2 | 2/2008 | Berger |
| 7,357,037 B2 | 4/2008 | Hnat et al. |
| 7,357,635 B2 | 4/2008 | Belfor et al. |
| 7,360,542 B2 | 4/2008 | Nelson et al. |
| 7,390,007 B2 | 6/2008 | Helms et al. |
| 7,390,294 B2 | 6/2008 | Hassler, Jr. |
| 7,402,134 B2 | 7/2008 | Moaddeb et al. |
| 7,402,176 B2 | 7/2008 | Malek |
| 7,429,259 B2 | 9/2008 | Cadeddu et al. |
| 7,445,010 B2 | 11/2008 | Kugler et al. |
| 7,458,981 B2 | 12/2008 | Fielding et al. |
| 7,485,149 B1 | 2/2009 | White |
| 7,489,495 B2 | 2/2009 | Stevenson |
| 7,530,981 B2 | 5/2009 | Kutsenko |
| 7,531,002 B2 | 5/2009 | Sutton et al. |
| 7,553,298 B2 | 6/2009 | Hunt et al. |
| 7,561,916 B2 | 7/2009 | Hunt et al. |
| 7,611,526 B2 | 11/2009 | Carl et al. |
| 7,618,435 B2 | 11/2009 | Opolski |
| 7,658,754 B2 | 2/2010 | Zhang et al. |
| 7,666,184 B2 | 2/2010 | Stauch |
| 7,666,210 B2 | 2/2010 | Franck et al. |
| 7,678,136 B2 | 3/2010 | Doubler et al. |
| 7,678,139 B2 | 3/2010 | Garamszegi et al. |
| 7,708,737 B2 | 5/2010 | Kraft et al. |
| 7,708,762 B2 | 5/2010 | McCarthy et al. |
| 7,727,143 B2 | 6/2010 | Birk et al. |
| 7,753,913 B2 | 7/2010 | Szakelyhidi, Jr. et al. |
| 7,753,915 B1 | 7/2010 | Eksler et al. |
| 7,762,998 B2 | 7/2010 | Birk et al. |
| 7,763,080 B2 | 7/2010 | Southworth |
| 7,766,855 B2 | 8/2010 | Miethke |
| 7,775,215 B2 | 8/2010 | Hassler, Jr. et al. |
| 7,776,068 B2 | 8/2010 | Ainsworth et al. |
| 7,776,075 B2 | 8/2010 | Bruneau et al. |
| 7,787,958 B2 | 8/2010 | Stevenson |
| 7,794,476 B2 | 9/2010 | Wisnewski |
| 7,811,328 B2 | 10/2010 | Molz, IV et al. |
| 7,835,779 B2 | 11/2010 | Anderson et al. |
| 7,837,691 B2 | 11/2010 | Cordes et al. |
| 7,862,586 B2 | 1/2011 | Malek |
| 7,867,235 B2 | 1/2011 | Fell et al. |
| 7,875,033 B2 | 1/2011 | Richter et al. |
| 7,901,381 B2 | 3/2011 | Birk et al. |
| 7,909,852 B2 | 3/2011 | Boomer et al. |
| 7,918,844 B2 | 4/2011 | Byrum et al. |
| 7,938,841 B2 | 5/2011 | Sharkawy et al. |
| 7,955,357 B2 | 6/2011 | Kiester |
| 7,985,256 B2 | 7/2011 | Grotz et al. |
| 7,988,709 B2 | 8/2011 | Clark et al. |
| 8,002,809 B2 | 8/2011 | Baynham |
| 8,011,308 B2 | 9/2011 | Picchio |
| 8,034,080 B2 | 10/2011 | Malandain et al. |
| 8,043,299 B2 | 10/2011 | Conway |
| 8,043,338 B2 | 10/2011 | Dant |
| 8,057,473 B2 | 11/2011 | Orsak et al. |
| 8,057,513 B2 | 11/2011 | Kohm et al. |
| 8,083,741 B2 | 12/2011 | Morgan et al. |
| 8,092,499 B1 | 1/2012 | Roth |
| 8,095,317 B2 | 1/2012 | Ekseth et al. |
| 8,105,360 B1 | 1/2012 | Connor |
| 8,114,158 B2 | 2/2012 | Carl et al. |
| 8,123,805 B2 | 2/2012 | Makower et al. |
| 8,133,280 B2 | 3/2012 | Voellmicke et al. |
| 8,147,549 B2 | 4/2012 | Metcalf, Jr. et al. |
| 8,162,897 B2 | 4/2012 | Byrum |
| 8,162,979 B2 | 4/2012 | Sachs et al. |
| 8,177,789 B2 | 5/2012 | Magill et al. |
| 8,197,490 B2 | 6/2012 | Pool et al. |
| 8,211,149 B2 | 7/2012 | Justis |
| 8,211,151 B2 | 7/2012 | Schwab et al. |
| 8,221,420 B2 | 7/2012 | Keller |
| 8,226,690 B2 | 7/2012 | Altarac et al. |
| 8,236,002 B2 | 8/2012 | Fortin et al. |
| 8,241,331 B2 | 8/2012 | Arnin |
| 8,246,630 B2 | 8/2012 | Manzi et al. |
| 8,252,063 B2 | 8/2012 | Stauch |
| 8,267,969 B2 | 9/2012 | Altarac et al. |
| 8,278,941 B2 | 10/2012 | Kroh et al. |
| 8,282,671 B2 | 10/2012 | Connor |
| 8,323,290 B2 | 12/2012 | Metzger et al. |
| 8,357,182 B2 | 1/2013 | Seme |
| 8,366,628 B2 | 2/2013 | Denker et al. |
| 8,372,078 B2 | 2/2013 | Collazo |
| 8,386,018 B2 | 2/2013 | Stauch et al. |
| 8,394,124 B2 | 3/2013 | Biyani |
| 8,403,958 B2 | 3/2013 | Schwab |
| 8,414,584 B2 | 4/2013 | Brigido |
| 8,425,608 B2 | 4/2013 | Dewey et al. |
| 8,435,268 B2 | 5/2013 | Thompson et al. |
| 8,439,926 B2 | 5/2013 | Bojarski et al. |
| 8,444,693 B2 | 5/2013 | Reiley |
| 8,469,908 B2 | 6/2013 | Asfora |
| 8,470,004 B2 | 6/2013 | Reiley |
| 8,486,070 B2 | 7/2013 | Morgan et al. |
| 8,486,076 B2 | 7/2013 | Chavarria et al. |
| 8,486,147 B2 | 7/2013 | De Villiers et al. |
| 8,494,805 B2 | 7/2013 | Roche et al. |
| 8,496,662 B2 | 7/2013 | Novak et al. |
| 8,518,062 B2 | 8/2013 | Cole et al. |
| 8,523,866 B2 | 9/2013 | Sidebotham et al. |
| 8,529,474 B2 | 9/2013 | Gupta et al. |
| 8,529,606 B2 | 9/2013 | Alamin et al. |
| 8,529,607 B2 | 9/2013 | Alamin et al. |
| 8,556,901 B2 | 10/2013 | Anthony et al. |
| 8,556,911 B2 | 10/2013 | Mehta et al. |
| 8,556,975 B2 | 10/2013 | Ciupik et al. |
| 8,562,653 B2 | 10/2013 | Alamin et al. |
| 8,568,457 B2 | 10/2013 | Hunziker |
| 8,579,979 B2 | 11/2013 | Edie et al. |
| 8,585,595 B2 | 11/2013 | Heilman |
| 8,585,740 B1 | 11/2013 | Ross et al. |
| 8,591,549 B2 | 11/2013 | Lange |
| 8,591,553 B2 | 11/2013 | Eisermann et al. |
| 8,613,758 B2 | 12/2013 | Linares |
| 8,617,220 B2 | 12/2013 | Skaggs |

(56) References Cited

U.S. PATENT DOCUMENTS

| | | |
|---|---|---|
| 8,623,036 B2 | 1/2014 | Harrison et al. |
| 8,632,544 B2 | 1/2014 | Haaja et al. |
| 8,632,548 B2 | 1/2014 | Soubeiran |
| 8,632,563 B2 | 1/2014 | Nagase et al. |
| 8,636,771 B2 | 1/2014 | Butler et al. |
| 8,636,802 B2 | 1/2014 | Serhan et al. |
| 8,641,719 B2 | 2/2014 | Gephart et al. |
| 8,641,723 B2 | 2/2014 | Connor |
| 8,657,856 B2 | 2/2014 | Gephart et al. |
| 8,663,285 B2 | 3/2014 | Dall et al. |
| 8,663,287 B2 | 3/2014 | Butler et al. |
| 8,668,719 B2 | 3/2014 | Alamin et al. |
| 8,709,090 B2 | 4/2014 | Makower et al. |
| 8,758,347 B2 | 6/2014 | Weiner et al. |
| 8,758,355 B2 | 6/2014 | Fisher et al. |
| 8,771,272 B2 | 7/2014 | LeCronier et al. |
| 8,777,947 B2 | 7/2014 | Zahrly et al. |
| 8,777,995 B2 | 7/2014 | McClintock et al. |
| 8,790,343 B2 | 7/2014 | McClellan et al. |
| 8,790,409 B2 | 7/2014 | Van den Heuvel et al. |
| 8,828,058 B2 | 9/2014 | Elsebaie et al. |
| 8,828,087 B2 | 9/2014 | Stone et al. |
| 8,840,651 B2 | 9/2014 | Reiley |
| 8,870,881 B2 | 10/2014 | Rezach et al. |
| 8,870,959 B2 | 10/2014 | Arnin |
| 8,915,915 B2 | 12/2014 | Harrison et al. |
| 8,915,917 B2 | 12/2014 | Doherty et al. |
| 8,920,422 B2 | 12/2014 | Homeier et al. |
| 8,945,188 B2 | 2/2015 | Rezach et al. |
| 8,961,521 B2 | 2/2015 | Keefer et al. |
| 8,961,567 B2 | 2/2015 | Hunziker |
| 8,968,402 B2 | 3/2015 | Myers et al. |
| 8,992,527 B2 | 3/2015 | Guichet |
| 9,022,917 B2 | 5/2015 | Kasic et al. |
| 9,044,218 B2 | 6/2015 | Young |
| 9,060,810 B2 | 6/2015 | Kercher et al. |
| 9,078,703 B2 | 7/2015 | Arnin |
| 2002/0050112 A1 | 5/2002 | Koch et al. |
| 2002/0072758 A1 | 6/2002 | Reo et al. |
| 2002/0164905 A1 | 11/2002 | Bryant |
| 2003/0040671 A1 | 2/2003 | Somogyi et al. |
| 2003/0144669 A1 | 7/2003 | Robinson |
| 2003/0220643 A1 | 11/2003 | Ferree |
| 2003/0220644 A1 | 11/2003 | Thelen et al. |
| 2004/0011137 A1 | 1/2004 | Hnat et al. |
| 2004/0011365 A1 | 1/2004 | Govari et al. |
| 2004/0019353 A1 | 1/2004 | Freid et al. |
| 2004/0023623 A1 | 2/2004 | Stauch et al. |
| 2004/0055610 A1 | 3/2004 | Forsell |
| 2004/0133219 A1 | 7/2004 | Forsell |
| 2004/0138725 A1 | 7/2004 | Forsell |
| 2004/0193266 A1 | 9/2004 | Meyer |
| 2005/0034705 A1 | 2/2005 | Mcclendon |
| 2005/0049617 A1 | 3/2005 | Chatlynne et al. |
| 2005/0065529 A1 | 3/2005 | Liu et al. |
| 2005/0090823 A1 | 4/2005 | Bartimus |
| 2005/0159754 A1 | 7/2005 | Odrich |
| 2005/0234448 A1 | 10/2005 | McCarthy |
| 2005/0234462 A1 | 10/2005 | Hershberger |
| 2005/0246034 A1 | 11/2005 | Soubeiran |
| 2005/0261779 A1 | 11/2005 | Meyer |
| 2005/0272976 A1 | 12/2005 | Tanaka et al. |
| 2006/0004459 A1 | 1/2006 | Hazebrouck et al. |
| 2006/0009767 A1* | 1/2006 | Kiester .................. A61B 17/70 606/279 |
| 2006/0036259 A1 | 2/2006 | Carl et al. |
| 2006/0036323 A1 | 2/2006 | Carl et al. |
| 2006/0036324 A1 | 2/2006 | Sachs et al. |
| 2006/0047282 A1 | 3/2006 | Gordon |
| 2006/0058792 A1 | 3/2006 | Hynes |
| 2006/0069447 A1 | 3/2006 | DiSilvestro et al. |
| 2006/0074448 A1 | 4/2006 | Harrison et al. |
| 2006/0079897 A1 | 4/2006 | Harrison et al. |
| 2006/0136062 A1 | 6/2006 | DiNello et al. |
| 2006/0142767 A1 | 6/2006 | Green et al. |
| 2006/0155279 A1 | 7/2006 | Ogilvie |
| 2006/0195087 A1 | 8/2006 | Sacher et al. |
| 2006/0195088 A1 | 8/2006 | Sacher et al. |
| 2006/0200134 A1 | 9/2006 | Freid et al. |
| 2006/0204156 A1 | 9/2006 | Takehara et al. |
| 2006/0235299 A1 | 10/2006 | Martinelli |
| 2006/0235424 A1 | 10/2006 | Vitale et al. |
| 2006/0241746 A1 | 10/2006 | Shaoulian et al. |
| 2006/0241767 A1 | 10/2006 | Doty |
| 2006/0249914 A1 | 11/2006 | Dulin |
| 2006/0271107 A1 | 11/2006 | Harrison et al. |
| 2006/0282073 A1 | 12/2006 | Simanovsky |
| 2006/0293683 A1 | 12/2006 | Stauch |
| 2007/0010814 A1 | 1/2007 | Stauch |
| 2007/0010887 A1 | 1/2007 | Williams et al. |
| 2007/0021644 A1 | 1/2007 | Woolson et al. |
| 2007/0031131 A1 | 2/2007 | Griffitts |
| 2007/0043376 A1 | 2/2007 | Leatherbury et al. |
| 2007/0050030 A1 | 3/2007 | Kim |
| 2007/0118215 A1 | 5/2007 | Moaddeb |
| 2007/0161984 A1 | 7/2007 | Cresina et al. |
| 2007/0173837 A1 | 7/2007 | Chan et al. |
| 2007/0179493 A1 | 8/2007 | Kim |
| 2007/0185374 A1 | 8/2007 | Kick et al. |
| 2007/0233098 A1 | 10/2007 | Mastrorio et al. |
| 2007/0239159 A1 | 10/2007 | Altarac et al. |
| 2007/0239161 A1 | 10/2007 | Giger et al. |
| 2007/0255088 A1 | 11/2007 | Jacobson et al. |
| 2007/0270803 A1 | 11/2007 | Giger et al. |
| 2007/0276368 A1 | 11/2007 | Trieu et al. |
| 2007/0276369 A1 | 11/2007 | Allard et al. |
| 2007/0276373 A1 | 11/2007 | Malandain |
| 2007/0276378 A1 | 11/2007 | Harrison et al. |
| 2007/0276493 A1 | 11/2007 | Malandain et al. |
| 2007/0288024 A1 | 12/2007 | Gollogly |
| 2007/0288183 A1 | 12/2007 | Bulkes et al. |
| 2008/0009792 A1 | 1/2008 | Henniges et al. |
| 2008/0015577 A1 | 1/2008 | Loeb |
| 2008/0021454 A1 | 1/2008 | Chao et al. |
| 2008/0021455 A1 | 1/2008 | Chao et al. |
| 2008/0021456 A1 | 1/2008 | Gupta et al. |
| 2008/0027436 A1 | 1/2008 | Cournoyer et al. |
| 2008/0033431 A1 | 2/2008 | Jung et al. |
| 2008/0033436 A1 | 2/2008 | Song et al. |
| 2008/0051784 A1 | 2/2008 | Gollogly |
| 2008/0082118 A1 | 4/2008 | Edidin et al. |
| 2008/0086128 A1 | 4/2008 | Lewis |
| 2008/0097487 A1 | 4/2008 | Pool et al. |
| 2008/0097496 A1 | 4/2008 | Chang et al. |
| 2008/0108995 A1 | 5/2008 | Conway et al. |
| 2008/0161933 A1 | 7/2008 | Grotz et al. |
| 2008/0167685 A1 | 7/2008 | Allard et al. |
| 2008/0172063 A1 | 7/2008 | Taylor |
| 2008/0177319 A1 | 7/2008 | Schwab |
| 2008/0177326 A1 | 7/2008 | Thompson |
| 2008/0190237 A1 | 8/2008 | Radinger et al. |
| 2008/0228186 A1 | 9/2008 | Gall et al. |
| 2008/0255615 A1 | 10/2008 | Vittur et al. |
| 2008/0272928 A1 | 11/2008 | Shuster |
| 2008/0275557 A1 | 11/2008 | Makower et al. |
| 2009/0030462 A1 | 1/2009 | Buttermann |
| 2009/0076597 A1 | 3/2009 | Dahlgren et al. |
| 2009/0082815 A1 | 3/2009 | Zylber et al. |
| 2009/0088803 A1 | 4/2009 | Justis et al. |
| 2009/0093820 A1 | 4/2009 | Trieu et al. |
| 2009/0093890 A1 | 4/2009 | Gelbart |
| 2009/0112262 A1 | 4/2009 | Pool et al. |
| 2009/0112263 A1 | 4/2009 | Pool et al. |
| 2009/0163780 A1 | 6/2009 | Tieu |
| 2009/0171356 A1 | 7/2009 | Klett |
| 2009/0192514 A1 | 7/2009 | Feinberg et al. |
| 2009/0198144 A1 | 8/2009 | Phillips et al. |
| 2009/0216113 A1 | 8/2009 | Meier et al. |
| 2009/0275984 A1 | 11/2009 | Kim et al. |
| 2010/0004654 A1 | 1/2010 | Schmitz et al. |
| 2010/0057127 A1 | 3/2010 | McGuire et al. |
| 2010/0094302 A1 | 4/2010 | Pool et al. |
| 2010/0094306 A1 | 4/2010 | Chang et al. |
| 2010/0100185 A1 | 4/2010 | Trieu et al. |

(56) References Cited

U.S. PATENT DOCUMENTS

| | | |
|---|---|---|
| 2010/0106192 A1 | 4/2010 | Barry |
| 2010/0114322 A1 | 5/2010 | Clifford et al. |
| 2010/0130941 A1 | 5/2010 | Conlon et al. |
| 2010/0137872 A1 | 6/2010 | Kam et al. |
| 2010/0145449 A1 | 6/2010 | Makower et al. |
| 2010/0145462 A1 | 6/2010 | Ainsworth et al. |
| 2010/0168751 A1 | 7/2010 | Anderson et al. |
| 2010/0249782 A1 | 9/2010 | Durham |
| 2010/0256626 A1 | 10/2010 | Muller et al. |
| 2010/0262239 A1 | 10/2010 | Boyden et al. |
| 2010/0318129 A1 | 12/2010 | Seme et al. |
| 2010/0331883 A1 | 12/2010 | Schmitz et al. |
| 2011/0004076 A1 | 1/2011 | Janna et al. |
| 2011/0057756 A1 | 3/2011 | Marinescu et al. |
| 2011/0066188 A1 | 3/2011 | Seme et al. |
| 2011/0098748 A1 | 4/2011 | Jangra |
| 2011/0152725 A1 | 6/2011 | Demir et al. |
| 2011/0196435 A1 | 8/2011 | Forsell |
| 2011/0202138 A1 | 8/2011 | Shenoy et al. |
| 2011/0238126 A1 | 9/2011 | Soubeiran |
| 2011/0257655 A1 | 10/2011 | Copf, Jr. |
| 2011/0284014 A1 | 11/2011 | Cadeddu et al. |
| 2012/0019341 A1 | 1/2012 | Gabay et al. |
| 2012/0019342 A1 | 1/2012 | Gabay et al. |
| 2012/0053633 A1 | 3/2012 | Stauch |
| 2012/0088953 A1 | 4/2012 | King |
| 2012/0109207 A1 | 5/2012 | Trieu |
| 2012/0116535 A1 | 5/2012 | Ratron et al. |
| 2012/0158061 A1 | 6/2012 | Koch et al. |
| 2012/0172883 A1 | 7/2012 | Sayago |
| 2012/0179215 A1 | 7/2012 | Soubeiran |
| 2012/0209265 A1* | 8/2012 | Pool ................ A61B 50/34 606/62 |
| 2012/0221106 A1 | 8/2012 | Makower et al. |
| 2012/0271353 A1 | 10/2012 | Barry |
| 2012/0296234 A1 | 11/2012 | Wilhelm et al. |
| 2012/0329882 A1 | 12/2012 | Messersmith et al. |
| 2013/0013066 A1 | 1/2013 | Landry et al. |
| 2013/0072932 A1 | 3/2013 | Stauch |
| 2013/0123847 A1 | 5/2013 | Anderson et al. |
| 2013/0138017 A1 | 5/2013 | Jundt et al. |
| 2013/0138154 A1 | 5/2013 | Reiley |
| 2013/0150863 A1 | 6/2013 | Baumgartner |
| 2013/0150889 A1 | 6/2013 | Fening et al. |
| 2013/0178903 A1 | 7/2013 | Abdou |
| 2013/0211521 A1 | 8/2013 | Shenoy et al. |
| 2013/0245692 A1 | 9/2013 | Hayes et al. |
| 2013/0253344 A1 | 9/2013 | Griswold et al. |
| 2013/0253587 A1 | 9/2013 | Carls et al. |
| 2013/0261672 A1 | 10/2013 | Horvath |
| 2013/0296863 A1 | 11/2013 | Globerman et al. |
| 2013/0296864 A1 | 11/2013 | Burley et al. |
| 2013/0296940 A1 | 11/2013 | Northcutt et al. |
| 2013/0325006 A1 | 12/2013 | Michelinie et al. |
| 2013/0325071 A1 | 12/2013 | Niemiec et al. |
| 2014/0005788 A1 | 1/2014 | Haaja et al. |
| 2014/0025172 A1 | 1/2014 | Lucas et al. |
| 2014/0031870 A1* | 1/2014 | Chang ................ A61B 17/705 606/264 |
| 2014/0052134 A1 | 2/2014 | Orisek |
| 2014/0058392 A1 | 2/2014 | Mueckter et al. |
| 2014/0058450 A1 | 2/2014 | Arlet |
| 2014/0066987 A1 | 3/2014 | Hestad et al. |
| 2014/0088715 A1 | 3/2014 | Ciupik |
| 2014/0128920 A1 | 5/2014 | Kantelhardt |
| 2014/0163664 A1 | 6/2014 | Goldsmith |
| 2014/0236234 A1 | 8/2014 | Kroll et al. |
| 2014/0236311 A1 | 8/2014 | Vicatos et al. |
| 2014/0250674 A1 | 9/2014 | Pool et al. |
| 2014/0257412 A1 | 9/2014 | Patty et al. |
| 2014/0277446 A1 | 9/2014 | Clifford et al. |
| 2014/0296918 A1 | 10/2014 | Fening et al. |
| 2014/0303538 A1 | 10/2014 | Baym et al. |
| 2014/0303539 A1 | 10/2014 | Baym et al. |
| 2014/0358150 A1 | 12/2014 | Kaufman et al. |
| 2015/0105782 A1 | 4/2015 | D'Lima et al. |
| 2015/0105824 A1 | 4/2015 | Moskowitz et al. |
| 2016/0183994 A1* | 6/2016 | Quach ................ A61B 17/8866 606/90 |
| 2020/0253588 A1* | 8/2020 | Bae ........................... A61F 2/02 |

FOREIGN PATENT DOCUMENTS

| | | |
|---|---|---|
| DE | 1541262 A1 | 6/1969 |
| DE | 8515687 U1 | 12/1985 |
| DE | 19626230 A1 | 1/1998 |
| DE | 19745654 A1 | 4/1999 |
| DE | 102005045070 A1 | 4/2007 |
| EP | 0663184 A1 | 7/1995 |
| EP | 1905388 A1 | 4/2008 |
| FR | 2901991 A1 | 12/2007 |
| FR | 2900563 B1 | 8/2008 |
| FR | 2892617 B1 | 9/2008 |
| FR | 2916622 B1 | 9/2009 |
| FR | 2961386 B1 | 12/2011 |
| JP | H0956736 | 3/1997 |
| JP | 2002500063 A | 1/2002 |
| JP | 2011502003 A | 1/2011 |
| WO | WO1998044858 A1 | 10/1998 |
| WO | WO1999051160 A1 | 10/1999 |
| WO | WO2001024697 A1 | 4/2001 |
| WO | WO2001045485 A3 | 6/2001 |
| WO | WO2001045487 A2 | 6/2001 |
| WO | WO2001067973 A2 | 9/2001 |
| WO | WO2001078614 A1 | 10/2001 |
| WO | WO2007013059 A3 | 2/2007 |
| WO | WO2007015239 A3 | 2/2007 |
| WO | 2009058546 A1 | 5/2009 |
| WO | WO2011116158 A3 | 9/2011 |
| WO | WO2013119528 A1 | 8/2013 |
| WO | WO2014040013 A1 | 3/2014 |
| WO | 2017/066774 A1 | 4/2017 |

OTHER PUBLICATIONS

Ahlbom et al., "Guidelines for limiting exposure to time-varying electric, magnetic, and electromagnetic fields (up to 300 GHz). International Commission on Non-Ionizing Radiation Protection.", Health Physics, 1998, pp. 494-522, 74, No. 4.

Amer et al., "Evaluation of treatment of late-onset tibia vara using gradual angulation translation high tibial osteotomy", ACTA Orthopaedica Belgica, 2010, pp. 360-366, 76, No. 3.

Angrisani et al., "Lap-Band® Rapid Port™M System: Preliminary results in 21 patients", Obesity Surgery, 2005, p. 936, 15, No. 7.

Baumgart et al., "A fully implantable, programmable distraction nail (Fitbone)—new perspectives for corrective and reconstructive limb surgery.", Practice of Intramedullary Locked Nails, 2006, pp. 189-198.

Baumgart et al., "The bioexpandable prosthesis: A new perspective after resection of malignant bone tumors in children.", J Pediatr Hematol Oncol, 2005, pp. 452-455, 27, No. 8.

Bodó et al., "Development of a tension-adjustable implant for anterior cruciate ligament reconstruction.", Eklem Hastaliklari ve Cerrahisi—Joint Diseases and Related Surgery, 2008, pp. 27-32, 19, No. 1.

Boudjemline et al., "Off-label use of an adjustable gastric banding system for pulmonary artery banding.", The Journal of Thoracic and Cardiovascular Surgery, 2006, pp. 1130-1135, 131, No. 5.

Brown et al., "Single port surgery and the Dundee Endocone.", SAGES Annual Scientific Sessions: Emerging Technology Poster Abstracts, 2007, ETP007, pp. 323-324.

Buchowski et al., "Temporary internal distraction as an aid to correction of severe scoliosis", J Bone Joint Surg Am, 2006, pp. 2035-2041, 88-A, No. 9.

Burghardt et al., "Mechanical failure of the Intramedullary Skeletal Kinetic Distractor in limb lengthening.", J Bone Joint Surg Br, 2011, pp. 639-643, 93-B, No. 5.

Burke, "Design of a minimally invasive non fusion device for the surgical management of scoliosis in the skeletally immature", Studies in Health Technology and Informatics, 2006, pp. 378-384, 123.

(56) References Cited

OTHER PUBLICATIONS

Carter et al., "A cumulative damage model for bone fracture.", Journal of Orthopaedic Research, 1985, pp. 84-90, 3, No. 1.
Chapman et al., "Laparoscopic adjustable gastric banding in the treatment of obesity: A systematic literature review.", Surgery, 2004, pp. 326-351, 135, No. 3.
Cole et al., "Operative technique intramedullary skeletal kinetic distractor: Tibial surgical technique.", Orthofix, 2005.
Cole et al., "The intramedullary skeletal kinetic distractor (ISKD): first clinical results of a new intramedullary nail for lengthening of the femur and tibia.", Injury, 2001, pp. S-D-129-S-D-139, 32.
Dailey et al., "A novel intramedullary nail for micromotion stimulation of tibial fractures.", Clinical Biomechanics, 2012, pp. 182-188, 27, No. 2.
Daniels et al., "A new method for continuous intraoperative measurement of Harrington rod loading patterns.", Annals of Biomedical Engineering, 1984, pp. 233-246, 12, No. 3.
De Giorgi et al., "Cotrel-Dubousset instrumentation for the treatment of severe scoliosis.", European Spine Journal, 1999, pp. 8-15, No. 1.
Dorsey et al., "The stability of three commercially available implants used in medial opening wedge high tibial osteotomy.", Journal of Knee Surgery, 2006, pp. 95-98, 19, No. 2.
Edeland et al., "Instrumentation for distraction by limited surgery in scoliosis treatment.", Journal of Biomedical Engineering, 1981, pp. 143-146, 3, No. 2.
Elsebaie, "Single growing rods (Review of 21 cases). Changing the foundations: Does it affect the results?", Journal of Child Orthop, 2007, 1:258.
Ember et al., "Distraction forces required during growth rod lengthening.", J of Bone Joint Surg BR, 2006, p. 229, 88-B, No. Suppl. II.
European Patent Office, "Observations by a third party under Article 115 EPC in EP08805612 by Soubeiran.", 2010.
Fabry et al., "A technique for prevention of port complications after laparoscopic adjustable silicone gastric banding.", Obesity Surgery, 2002, pp. 285-288, 12, No. 2.
Fried et al., "In vivo measurements of different gastric band pressures towards the gastric wall at the stoma region.", Obesity Surgery, 2004, p. 914, 14, No. 7.
Gao et al., CHD7 gene polymorphisms are associated with susceptibility to idiopathic scoliosis, American Journal of Human Genetics, 2007, pp. 957-965, 80.
Gebhart et al., "Early clinical experience with a custom made growing endoprosthesis in children with malignant bone tumors of the lower extremity actioned by an external permanent magnet; The Phenix M. system", International Society of Limb Salvage 14th International Symposium on Limb Salvage. Sep. 3, 2007, Hamburg, Germany. (2 pages).
Gillespie et al. "Harrington instrumentation without fusion.", J Bone Joint Surg Br, 1981, p. 461, 63-B, No. 3.
Goodship et al., "Strain rate and timing of stimulation in mechanical modulation of fracture healing.", Clinical Orthopaedics and Related Research, 1998, pp. S105-S115, No. 355S.
Grass et al., "Intermittent distracting rod for correction of high neurologic risk congenital scoliosis.", SPINE, 1997, pp. 1922-1927, 22, No. 16.
Gray, "Gray's anatomy of the human body.", http://education.yahoo.com/reference/gray/subjects/subject/128, published Jul. 1, 2007.
Grimer et al. "Non-invasive extendable endoprostheses for children—Expensive but worth it!", International Society of Limb Salvage 14th International Symposium on Limb Salvage, 2007.
Grünert, "The development of a totally implantable electronic sphincter." (translated from the German "Die Entwicklung eines total implantierbaren elektronischen Sphincters"), Langenbecks Archiv fur Chirurgie, 1969, pp. 1170-1174, 325.
Guichet et al. "Gradual femoral lengthening with the Albizzia intramedullary nail", J Bone Joint Surg Am, 2003, pp. 838-848, 85-A, No. 5.
Gupta et al., "Non-invasive distal femoral expandable endoprosthesis for limb-salvage surgery in paediatric tumours.", J Bone Joint Surg Br, 2006, pp. 649-654, 88-B, No. 5.
Hankemeier et al., "Limb lengthening with the Intramedullary Skeletal Kinetic Distractor (ISKD).", Oper Orthop Traumatol, 2005, pp. 79-101, 17, No. 1.
Harrington, "Treatment of scoliosis. Correction and internal fixation by spine instrumentation.", J Bone Joint Surg Am, 1962, pp. 591-610, 44-A, No. 4.
Hennig et al., "The safety and efficacy of a new adjustable plate used for proximal tibial opening wedge osteotomy in the treatment of unicompartmental knee osteoarthrosis.", Journal of Knee Surgery, 2007, pp. 6-14, 20, No. 1.
Hofmeister et al., "Callus distraction with the Albizzia nail.", Practice of Intramedullary Locked Nails, 2006, pp. 211-215.
Horbach et al., "First experiences with the routine use of the Rapid Port™system with the Lap-Band®.", Obesity Surgery, 2006, p. 418, 16, No. 4.
Hyodo et al., "Bone transport using intramedullary fixation and a single flexible traction cable.", Clinical Orthopaedics and Related Research, 1996, pp. 256-268, 325.
International Commission on Non-Ionizing Radiation Protection, "Guidelines on limits of exposure to static magnetic fields." Health Physics, 2009, pp. 504-514, 96, No. 4.
INVIS®/Lamello Catalog, 2006, Article No. 68906A001 GB.
Kasliwal et al., "Management of high-grade spondylolisthesis.", Neurosurgery Clinics of North America, 2013, pp. 275-291, 24, No. 2.
Kenawey et al., "Leg lengthening using intramedullay skeletal kinetic distractor: Results of 57 consecutive applications.", Injury, 2011, pp. 150-155, 42, No. 2.
Kent et al., "Assessment and correction of femoral malrotation following intramedullary nailing of the femur.", Acta Orthop Belg, 2010, pp. 580-584, 76, No. 5.
Klemme et al., "Spinal instrumentation without fusion for progressive scoliosis in young children", Journal of Pediatric Orthopaedics. 1997, pp. 734-742, 17, No. 6.
Korenkov et al., "Port function after laparoscopic adjustable gastric banding for morbid obesity.", Surgical Endoscopy, 2003, pp. 1068-1071, 17, No. 7.
Krieg et al., "Leg lengthening with a motorized nail in adolescents.", Clinical Orthopaedics and Related Research, 2008, pp. 189-197, 466, No. 1.
Kucukkaya et al., "The new intramedullary cable bone transport technique.", Journal of Orthopaedic Trauma, 2009, pp. 531-536, 23, No. 7.
Lechner et al., "In vivo band manometry: A new method in band adjustment", Obesity Surgery, 2005, p. 935, 15, No. 7.
Lechner et al., "Intra-band manometry for band adjustments: The basics", Obesity Surgery, 2006, pp. 417-418, 16, No. 4.
Li et al., "Bone transport over an intramedullary nail: A case report with histologic examination of the regenerated segment.", Injury, 1999, pp. 525-534, 30, No. 8.
Lonner, "Emerging minimally invasive technologies for the management of scoliosis.", Orthopedic Clinics of North America, 2007, pp. 431-440, 38, No. 3.
Matthews et al., "Magnetically adjustable intraocular lens.", Journal of Cataract and Refractive Surgery, 2003, pp. 2211-2216, 29, No. 11.
Micromotion, "Micro Drive Engineering. General catalogue.", 2009, pp. 14-24.
Mineiro et al., "Subcutaneous rodding for progressive spinal curvatures: Early results.", Journal of Pediatric Orthopaedics, 2002, pp. 290-295, 22, No. 3.
Moe et al., "Harrington instrumentation without fusion plus external orthotic support for the treatment of difficult curvature problems in young children.", Clinical Orthopaedics and Related Research, 1984, pp. 35-45, 185.
Montague et al., "Magnetic gear dynamics for servo control.", Melecon 2010-2010 15th IEEE Mediterranean Electrotechnical Conference, Valletta, 2010, pp. 1192-1197.
Montague et al., "Servo control of magnetic gears.", IEEE/ASME Transactions on Mechatronics, 2012, pp. 269-278, 17, No. 2.

(56) References Cited

OTHER PUBLICATIONS

Nachemson et al., "Intravital wireless telemetry of axial forces in Harrington distraction rods in patients with idiopathic scoliosis.", The Journal of Bone and Joint Surgery, 1971, pp. 445-465, 53, No. 3.
Nachlas et al., "The cure of experimental scoliosis by directed growth control.", The Journal of Bone and Joint Surgery, 1951, pp. 24-34, 33-A, No. 1.
Newton et al., "Fusionless scoliosis correction by anterolateral tethering . . . can it work?. ", 39th Annual Scoliosis Research Society Meeting, 2004.
Oh et al., "Bone transport over an intramedullary nail for reconstruction of long bone defects in tibia.", Archives of Orthopaedic and Trauma Surgery, 2008, pp. 801-808, 128, No. 8.
Ozcivici et al., "Mechanical signals as anabolic agents in bone.", Nature Reviews Rheumatology, 2010, pp. 50-59, 6, No. 1.
Piorkowski et al., Preventing Port Site Inversion in Laparoscopic Adjustable Gastric Banding, Surgery for Obesity and Related Diseases, 2007, 3(2), pp. 159-162, Elsevier; New York, U.S.A.
Prontes, "Longest bone in body.", eHow.com, 2012.
Rathjen et al., "Clinical and radiographic results after implant removal in idiopathic scoliosis.", SPINE, 2007, pp. 2184-2188, 32, No. 20.
Ren et al., "Laparoscopic adjustable gastric banding: Surgical technique", Journal of Laparoendoscopic & Advanced Surgical Techniques, 2003, pp. 257-263, 13, No. 4.
Reyes-Sanchez et al., "External fixation for dynamic correction of severe scoliosis", The Spine Journal, 2005, pp. 418-426, 5, No. 4.
Rinsky et al., "Segmental instrumentation without fusion in children with progressive scoliosis.", Journal of Pediatric Orthopedics, 1985, pp. 687-690, 5, No. 6.
Rode et al., "A simple way to adjust bands under radiologic control", Obesity Surgery, 2006, p. 418, 16, No. 4.
Schmerling et al., "Using the shape recovery of nitinol in the Harrington rod treatment of scoliosis.", Journal of Biomedical Materials Research, 1976, pp. 879-892, 10, No. 6.
Scott et al., "Transgastric, transcolonic and transvaginal cholecystectomy using magnetically anchored instruments.", SAGES Annual Scientific Sessions, Poster Abstracts, Apr. 18-22, 2007, P511, p. 306.
Sharke, "The machinery of life", Mechanical Engineering Magazine, Feb. 2004, Printed from Internet site Oct. 24, 2007 http://www.memagazine.org/contents/current/features/moflife/moflife.html.
Shiha et al., "Ilizarov gradual correction of genu varum deformity in adults.", Acta Orthop Belg, 2009, pp. 784-791, 75, No. 6.
Simpson et al., "Femoral lengthening with the intramedullary skeletal kinetic distractor.", Journal of Bone and Joint Surgery, 2009, pp. 955-961, 91-B, No. 7.
Smith, "The use of growth-sparing instrumentation in pediatric spinal deformity.", Orthopedic Clinics of North America, 2007, pp. 547-552, 38, No. 4.
Soubeiran et al. "The Phenix M System, a fully implanted noninvasive lengthening device externally controllable through the skin with a palm size permanent magnet. Applications in limb salvage." International Society of Limb Salvage 14th International Symposium on Limb Salvage, Sep. 13, 2007, Hamburg, Germany. (2 pages).
Soubeiran et al., "The Phenix M System. A fully implanted lengthening device externally controllable through the skin with a palm size permanent magnet; Applications to pediatric orthopaedics", 6th European Research Conference in Pediatric Orthopaedics, Oct. 6, 2006, Toulouse, France (7 pages).
Stokes et al., "Reducing radiation exposure in early-onset scoliosis surgery patients: Novel use of ultrasonography to measure lengthening in magnetically-controlled growing rods. Prospective validation study and assessment of clinical algorithm", 20th International Meeting on Advanced Spine Techniques, Jul. 11, 2013. Vancouver, Canada. Scoliosis Research Society.
Sun et al., "Masticatory mechanics of a mandibular distraction osteogenesis site: Interfragmentary micromovement.", Bone, 2007, pp. 188-196, 41, No. 2.
Synthes Spine, "VEPTR II. Vertical Expandable Prosthetic Titanium Rib II: Technique Guide.", 2008, 40 pgs.
Synthes Spine, "VEPTR Vertical Expandable Prosthetic Titanium Rib, Patient Guide.", 2005, 26 pgs.
Takaso et al., "New remote-controlled growing-rod spinal instrumentation possibly applicable for scoliosis in young children.", Journal of Orthopaedic Science, 1998, pp. 336-340, 3, No. 6.
Teli et al., "Measurement of forces generated during distraction of growing rods.", Journal of Children's Orthopaedics, 2007, pp. 257-258, 1, No. 4.
Tello, "Harrington instrumentation without arthrodesis and consecutive distraction program for young children with severe spinal deformities: Experience and technical details.", The Orthopedic Clinics of North America, 1994, pp. 333-351, 25, No. 2.
Thaller et al., "Limb lengthening with fully implantable magnetically actuated mechanical nails (PHENIX®)-Preliminary results.", Injury, 2014 (E-published Oct. 28, 2013), pp. S60-S65, 45.
Thompson et al., "Early onset scoliosis: Future directions", 2007, J Bone Joint Surg Am, pp. 163-166, 89-A, Suppl 1.
Thompson et al., "Growing rod techniques in early-onset scoliosis", Journal of Pediatric Orthopedics, 2007, pp. 354-361, 27, No. 3.
Thonse et al., "Limb lengthening with a fully implantable, telescopic, intramedullary nail.", Operative Techniques in Orthopedics, 2005, pp. 355-362, 15, No. 4.
Trias et al., "Dynamic loads experienced in correction of idiopathic scoliosis using two types of Harrington rods.", SPINE, 1979, pp. 228-235, 4, No. 3.
Verkerke et al., "An extendable modular endoprosthetic system for bone tumor management in the leg", Journal of Biomedical Engineering, 1990, pp. 91-96, 12, No. 2.
Verkerke et al., "Design of a lengthening element for a modular femur endoprosthetic system", Proceedings of the Institution of Mechanical Engineers Part H: Journal of Engineering in Medicine, 1989, pp. 97-102, 203, No. 2.
Verkerke et al., "Development and test of an extendable endoprosthesis for bone reconstruction in the leg.", The International Journal of Artificial Organs, 1994, pp. 155-162, 17, No. 3.
Weiner et al., "Initial clinical experience with telemetrically adjustable gastric banding", Surgical Technology International, 2005, pp. 63-69, 15.
Wenger, "Spine jack operation in the correction of scoliotic deformity: A direct intrathoracic attack to straighten the laterally bent spine: Preliminary report", Arch Surg, 1961, pp. 123-132 (901-910), 83, No. 6.
White, III et al., "The clinical biomechanics of scoliosis.", Clinical Orthopaedics and Related Research, 1976, pp. 100-112, 118.
Yonnet, "A new type of permanent magnet coupling.", IEEE Transactions on Magnetics, 1981, pp. 2991-2993, 17, No. 6.
Yonnet, "Passive magnetic bearings with permanent magnets.", IEEE Transactions on Magnetics, 1978, pp. 803-805, 14, No. 5.
Zheng et al., "Force and torque characteristics for magnetically driven blood pump.", Journal of Magnetism and Magnetic Materials, 2002, pp. 292-302, 241, No. 2.

* cited by examiner

ACOUSTIC REPORTING FOR DYNAMIC IMPLANTS

CROSS REFERENCE TO RELATED APPLICATIONS

The present patent application is a US national stage entry of International Patent Application Serial No. PCT/US2020/048002, filed Aug. 26, 2020, which claims priority to U.S. Provisional Application Ser. No. 62/895,391, filed Sep. 3, 2019. Each of the foregoing is incorporated by reference as though fully set forth herein.

BACKGROUND OF THE INVENTION

Field of the Invention

The present disclosure relates generally to monitoring adjustment of expandable implants using ultrasound.

Description of the Related Art

Expandable implants need an accurate way to noninvasively monitor adjustment thereof. Current devices and methods of monitoring adjustment in expandable implants are insufficient because critical assumptions often introduce error into their measurements. Provided herein is a novel solution to the problem.

SUMMARY OF THE INVENTION

This disclosure includes devices and methods for measuring an amount of adjustment of an expandable implant using ultrasound.

In some embodiments, an ultrasound counter may include: a vibration element tuned for ultrasound vibration. The vibration element may be configured to produce an ultrasound vibration upon an agitation thereof with each ultrasound vibration corresponding to an amount of adjustment of the expandable implant.

In some embodiments, an expandable implant includes an ultrasound counter having: an agitating element and a vibration element tuned for ultrasonic vibration, the vibration element may be configured to produce an ultrasonic vibration upon an agitation by the agitating element, and each ultrasonic vibration may correspond to an amount of adjustment of the expandable implant.

In some embodiments, an expandable implant includes: a housing configured to be secured to a bone of a patient at a first location; a rod configured for telescopic engagement with the housing, the rod configured to be secured to a bone of a patient at a second location; an ultrasound counter having at least one vibration element tuned for ultrasound vibration, the vibration element may be configured to produce an ultrasound vibration upon an agitation thereof with each ultrasound vibration corresponding to an amount of adjustment of the expandable implant.

An embodiment of a method for measuring a change in dimension of an implant using ultrasound includes the steps: (i) providing an expandable implant having a vibration element tuned for ultrasonic vibration, the vibration element configured to produce an ultrasonic vibration upon an adjustment of the expandable implant; (ii) adjusting the expandable implant; (iii) counting a number of ultrasonic vibrations produced by the vibration element; (iv) calculating a change in dimension from the total number of vibrations produced by the vibration element.

An embodiment of a method for measuring a change in dimension of an implant using ultrasound includes the steps: (i.) Providing an expandable implant having an agitation element configured to move upon an adjustment of the expandable implant and a vibration element tuned for ultrasonic vibration, the vibration element configured to produce an ultrasonic vibration upon an agitation by the agitation element. (ii.) Adjusting the expandable implant. (iii.) Counting a total number of ultrasonic vibrations produced by the vibration element. (iv.) Calculating a change in dimension from the total number of vibrations produced by the vibration element.

BRIEF DESCRIPTION OF THE DRAWINGS

These and other features may be further understood by those with skill in the art upon a review of the appended drawings, wherein.

DETAILED DESCRIPTION

Figure 1:
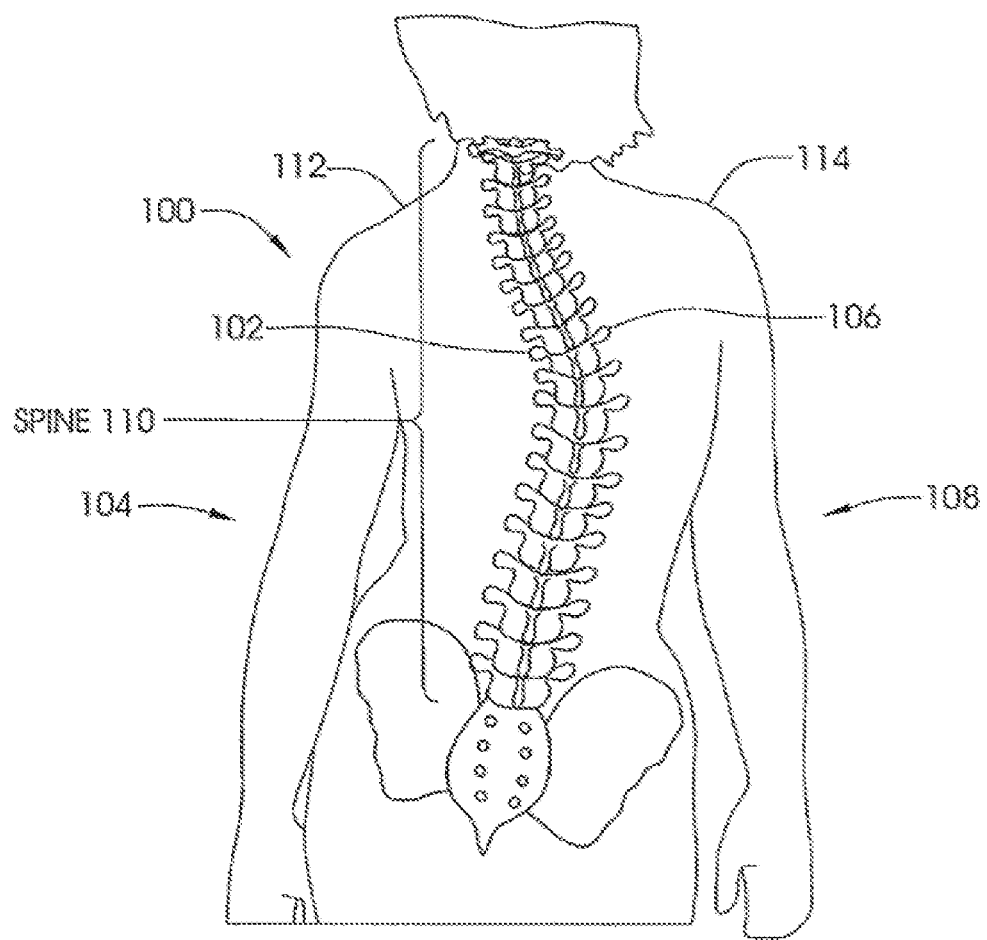
FIG. 1 shows the spine of a patient having scoliosis.

For purposes of explanation and not limitation, details and descriptions of certain preferred embodiments and methods are hereinafter provided such that one having ordinary skill in the art may be enabled to make and use the invention. These details and descriptions are representative only of certain preferred embodiments. However, a myriad of other embodiments which will not be expressly described will be readily understood by those having skill in the art upon a thorough review hereof.

In medical implants, transcutaneous transmission of information is particularly difficult at Radio Frequencies (RF) because of the attenuation characteristics in fluids and aqueous tissues experienced within the human body by RF transmission frequencies. Ultrasound frequencies however, have mitigated attenuation characteristics and superior transmission qualities when transmitted through fluids and aqueous tissues, especially as compared with RF.

Another benefit of ultrasound frequencies is their demonstrated and superior transmission characteristics through metal. This is particularly useful in medical implants, distraction rods for example, where metals like titanium are often included.

The frequency of ultrasound sound waves of the ultrasound signal chosen for transcutaneous communication should be generally greater than about 20 kilohertz (kHz). In some embodiments, the frequency of ultrasound sound waves may be between 200 and 400 kHz or about 300 kHz. In some embodiments, 50 kHz may be used. The ultrasound signal may include The benefits of utilizing ultrasound sound waves for transcutaneous communication using an ultrasound signal include: (1) that ultrasound sound waves have both favorable propagation and minimal attenuation characteristics through metal or solid mediums (e.g., metallic medical implants), and (2) that ultrasound sound waves have favorable propagation and minimal attenuation characteristics through various aqueous tissues in animals (e.g. human skin, muscle and bone).

One of the challenges with expandable implants, particularly implants that can be adjusted non-invasively, is that previously there existed no reliable in situ method of measuring an amount of adjustment of the expandable implant short of radiographic imaging the expandable implant, and for e.g. exposing the patient to an additional amounts of radiation.

In distraction rods for example, one can monitor adjustment of the distraction rod by taking advantage of the fact that rotation of the internal magnet of the distraction rod, has a direct relationship with a quantified amount of distraction of the distraction rod. Similarly, one can monitor adjustment of the distraction rod by taking advantage of the fact that movement of one surface relative to another will have a direct relationship with a quantified amount of distraction of the distraction rod.

The mechanism to distract the distraction rod may include coupling an internal magnet of the distraction rod with one or more external magnet of an External Adjustment Device sometimes referred to as an External Remote Controller (ERC). Thus, one might assume there should be a fixed correlation between rotation of the external magnet with rotation of the internal magnet. Therefore, by monitoring rotation of the external magnet one can approximate an amount of rotation of the internal magnet, and therefore deduce a total amount of distraction of the distraction rod.

Occasionally however, the one or more magnet of the ERC may become decoupled from the internal magnet of the expandable implant, at least temporarily, and while the one or more external magnet rotates the internal magnet of the distraction rod may not. This is sometimes referred to as slippage or stalling. As a result, monitoring the rotation of the external magnets alone may not necessarily provide a completely accurate measurement of the adjustment or distraction of the distraction rod.

In a general embodiment, an expandable implant configured to be measured using ultrasound includes a vibration element tuned for ultrasonic vibration, with the vibration element configured to produce an ultrasonic vibration upon an adjustment of the expandable implant, and each ultrasonic vibration corresponding to an amount of adjustment of the expandable implant.

Because ultrasound frequencies have favorable transmission characteristics in fluids, aqueous tissues and even metals, the resulting ultrasonic emissions may be observed locally at the expandable implant or by an external transceiver located outside of the patient. Similarly, in some embodiments one or more other implants may include one or more ultrasonic transducer configured to detect and report an amount of adjustment of the ultrasound implant.

Now, the one or more ultrasound transducer may include: piezoelectric transducers, ingle crystal ultrasonic transducers, lead zirconate titanate (PZT) ultrasound transducers, piezoelectric polyvinylidene fluoride (PVDF) ultrasound transducers, capacitive micro-machined ultrasound transducers (CMUT), piezoelectric micro-machined ultrasound transducers (PMUT), or any ultrasound transducer commonly known and used in the art In some embodiments, the ultrasound transducer may be disposed on and within the expandable implant, operably connected to one or more of: a controller, a memory, a power supply, or any other electronic component disposed on the expandable implant, with the ultrasound transducer configured to count a number of ultrasounds transmissions emitted by the vibration element.

In some embodiments, the resulting ultrasound transmissions are observed by an ultrasound transducer located outside of the patient. For external observation it may be favorable to use an array of ultrasound transducers to maximize an amount of signal observed at increased distances. The ultrasound transducer may be disposed on and within an external device, for example the External Remote Control (ERC), and operably connected to one or more of: a controller, a memory, a power supply, and any known electronic component, with the ultrasound transducer configured to count a number of ultrasound transmissions produced by the vibration element. In some embodiments the ultrasound transducer is provided in contact with the skin of the patient to minimize an amount of air gap, since ultrasound waves experience large amounts of reflection at interfaces such as air gaps.

In some embodiments, the vibration element communicates with a surface of the expandable implant. That surface may be configured to move upon an adjustment of the expandable implant. The surface may include on or more agitation elements. The agitation elements may include bumps. Upon a communication of the bumps with the vibration element the vibration element will produce an ultrasound transmission.

In some embodiments, a shaft includes at least one agitation element configured to communicate with the vibration element upon a rotation of the shaft. Some embodiments include a plurality of vibration elements tuned for ultrasound vibration and a plurality of agitation elements disposed on the shaft, the plurality of agitation elements configured to communicate with the plurality of vibration elements to produce a plurality of ultrasound transmissions. An increased number of vibration elements will increase the magnitude of the transmissions produced, improving detection of the ultrasound transmissions. Improved signal strength is particularly useful when observing the ultrasound transmissions external to the patient.

In some embodiments, the vibration element communicates with a surface of a rotatable internal magnet of an expandable implant. That rotatable internal magnet may be configured to rotate upon an adjustment of the expandable implant. The surface of the rotatable internal magnet may include one or more agitation elements. Upon a communication of the agitation element with the vibration element, the vibration element will produce an ultrasound transmission.

Now, turning to the drawings FIG. shows a patient 100 with scoliosis. The concave portion 102 of the spinal curve can be seen on the left side 104 of the patient 100, and the convex portion 106 can be seen on the right side 108 of the patient 100. Of course, in other patients, the concave portion 102 may appear on the right side 108 of the patient 100 while the convex portion 106 may be found on the left side 104 of the patient 100. In addition, as seen in FIG. 1, some rotation of the spine 110 is present, and unevenness between the left shoulder 112 and right shoulder 114 is seen.

Figure 2:
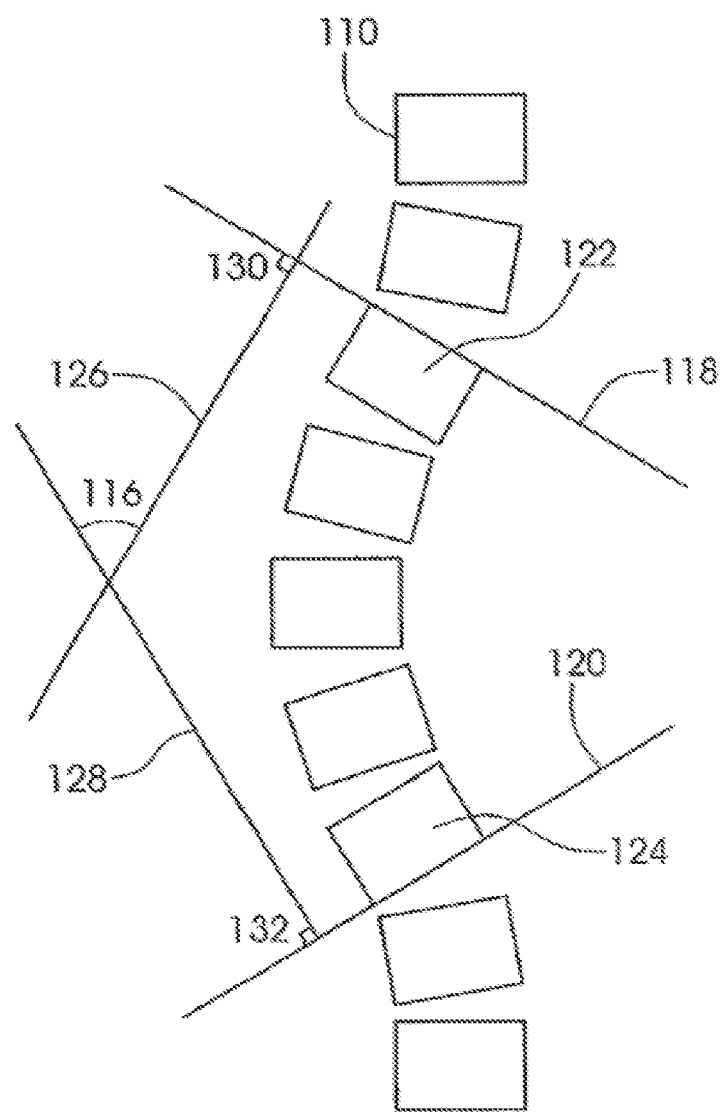
FIG. 2 shows an a Cobb angle of a patient having scoliosis.

FIG. 2 illustrates the Cobb angle 116 of a spine 110 of a patient with scoliosis. To determine the Cobb angle, lines 118 and 120 are drawn from vertebra 122 and 124, respectively. Intersecting perpendicular lines 126 and 128 are drawn by creating 900 angles 130 and 132 from lines 118 and 120. The angle 116 created from the crossing of the perpendicular lines 126 and 128 is defined as the Cobb angle. In a perfectly straight spine, this angle is 0°.

In patients with scoliosis, corrective surgery may be elected. The corrective surgery may include a placement of and adjustment of and expandable implant. Historically, adjustment required repeated surgeries each time adjustment of the expandable implant was required. Modernly, noninvasively expandable implants allow adjustment of these devices in situ. However, informational feedback from the expandable implants has proven difficult to receive.

Figure 3:
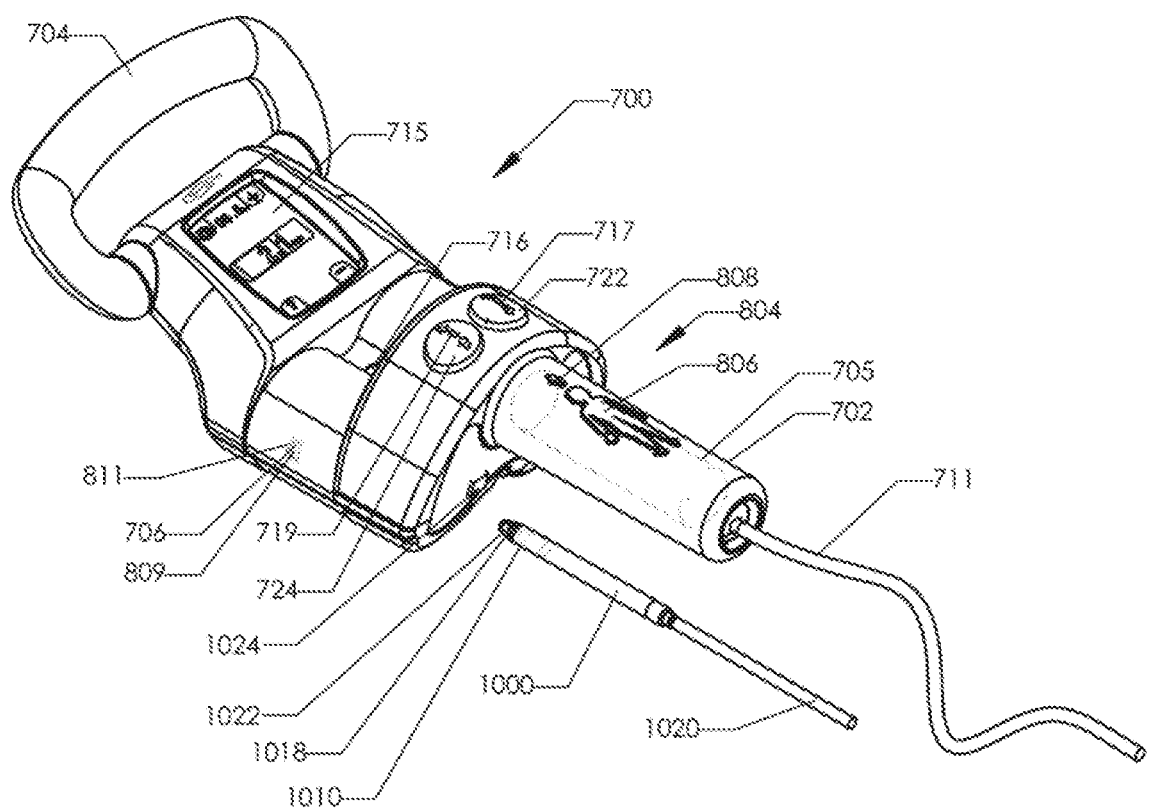
FIG. 3 shows an exemplary external adjustment device configured to noninvasively adjust an expandable implant in accordance with a first embodiment.

FIG. 3 illustrates an external adjustment device for example ERC 700 that is configured for adjusting an expandable implant 1000. The expandable implant 1000 may include any for example: number of distraction devices such as those disclosed in U.S. patent application Ser. Nos. 12/121,355, 12/250,442, 12/391,109, 11/172,678 which are incorporated by reference herein as if set forth in their entirety.

The distraction device 1000 includes a housing 1018 configured to be secured to a bone of a patient in a first location and a rod 1020 configured for telescopic engagement with the housing 1018, the rod 1020 configured to be secured to a bone of a patient in a second location.

The distraction device 1000 also includes a rotationally mounted, internal magnet 1010 that rotates in response to a magnetic field applied by the external adjustment device 700. Rotation of the magnet 1010 in one direction effectuates distraction while rotation of the magnet 1010 in the opposing direction effectuates retraction. Distraction includes a measurable increase in a total length of the expandable implant 1000, while retraction includes a measurable decrease in a total length of the expandable implant 1000.

In some embodiments, the internal magnet 1010 is operably coupled to a lead screw (FIG. 6, 1030), with a rotation of the internal magnet 1010 configured to rotate the lead screw 1030. The lead screw 1030 includes a threaded surface configured to communicate with a threaded surface of the rod 1020. Allowing a rotation of the lead screw 1030 to move the rod 1020 relative to the housing 1018.

In some embodiments, the external adjustment device 700 may be powered by a rechargeable battery and by a power cord 711. The external adjustment device 700 may include a first handle 702 and a second handle 704. The second handle 704 is shown in a looped shape, and can be used to carry the external adjustment device 700. The second handle 704 can also be used to steady the external adjustment device 700 during use. Generally, the first handle 702 of this embodiment extends linearly from a first end of the external adjustment device 700 while the second handle 704 is located at a second end of the external adjustment device 700 and extends substantially off axis or is angled with respect to the first handle 702.

Figure 4:
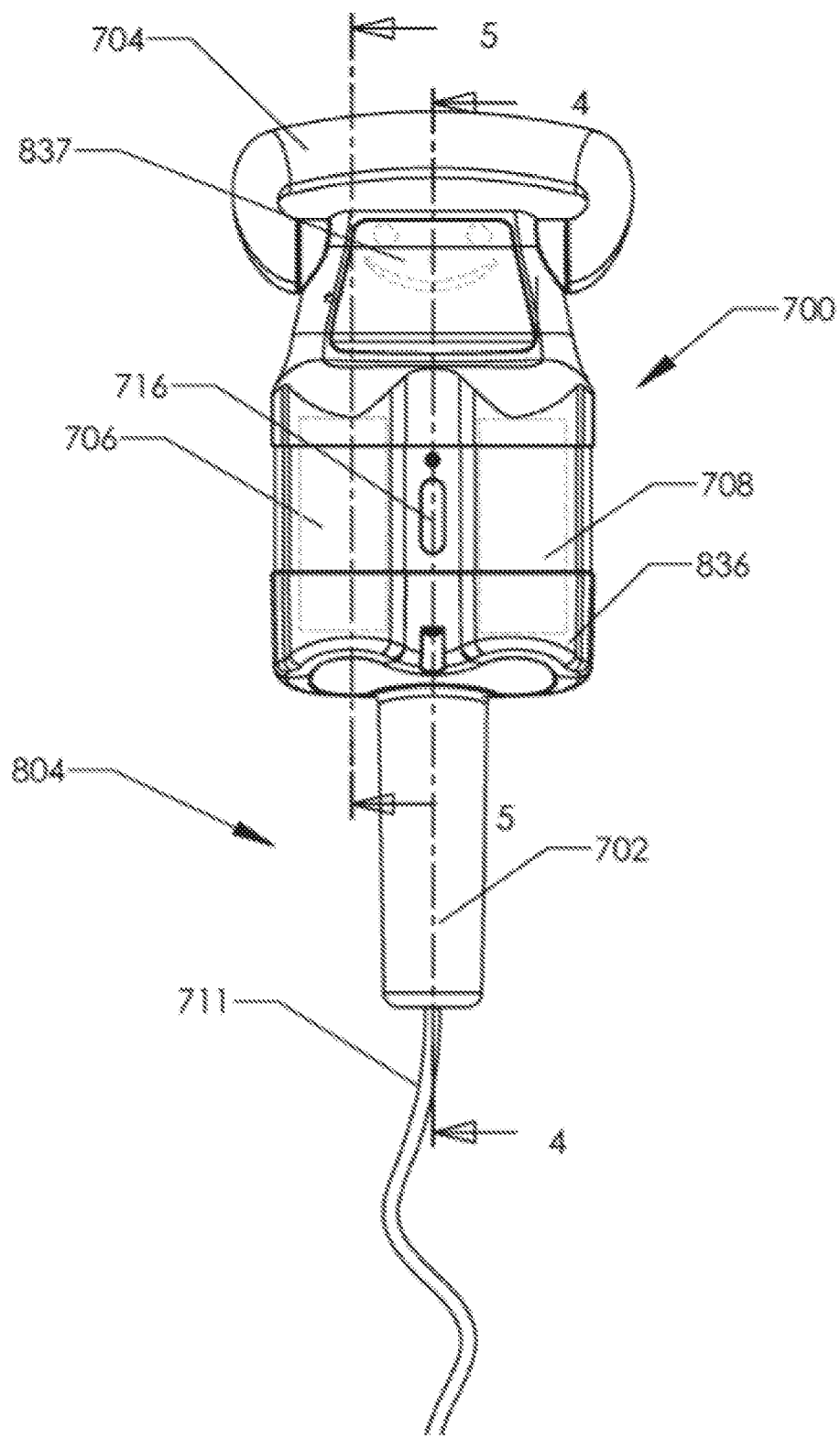
FIG. 4 shows the lower or underside surfaces of the exemplary external adjustment device.

The first handle 702 contains the motor 705 that drives a first external magnet 706 and a second external magnet 708 as best seen in FIG. 4, via gearing, belts and the like. On the first handle 702 is an optional orientation image 804 comprising a body outline 806 and an optional orientation arrow 808 that shows the correct direction to place the external adjustment device 700 on the patient's body, so that the expandable implant 1000 is adjusted in the relative direction. While holding the first handle 702, the operator presses with his thumb the distraction button 722, which has a distraction symbol 717, and is a first color, for example green. This distracts the expandable implant 1000. If the expandable implant 1000 is over-distracted and it is desired to retract, or to lessen the distraction of the expandable implant 1000, the operator presses with his thumb the retraction button 724 which has a retraction symbol 719.

Distraction turns the magnets 706, 708 one direction and retraction turns the magnets 706, 708 in the opposite direction. The magnets 706, 708 include stripes 809 that can be seen in window 811. This allows easy identification of whether the magnets 706, 708 are stationary or turning, and in which direction they are turning. This allows quick trouble shooting by the operator. The operator can determine the point on the patient where the internal magnet 1010 of the expandable implant 1000 is located, and can then put the external adjustment device 700 in correct location with respect to the expandable implant 1000, by marking the corresponding portion of the skin of the patient, and then viewing this spot through the alignment window 716 of the external adjustment device 700.

Figure 5:
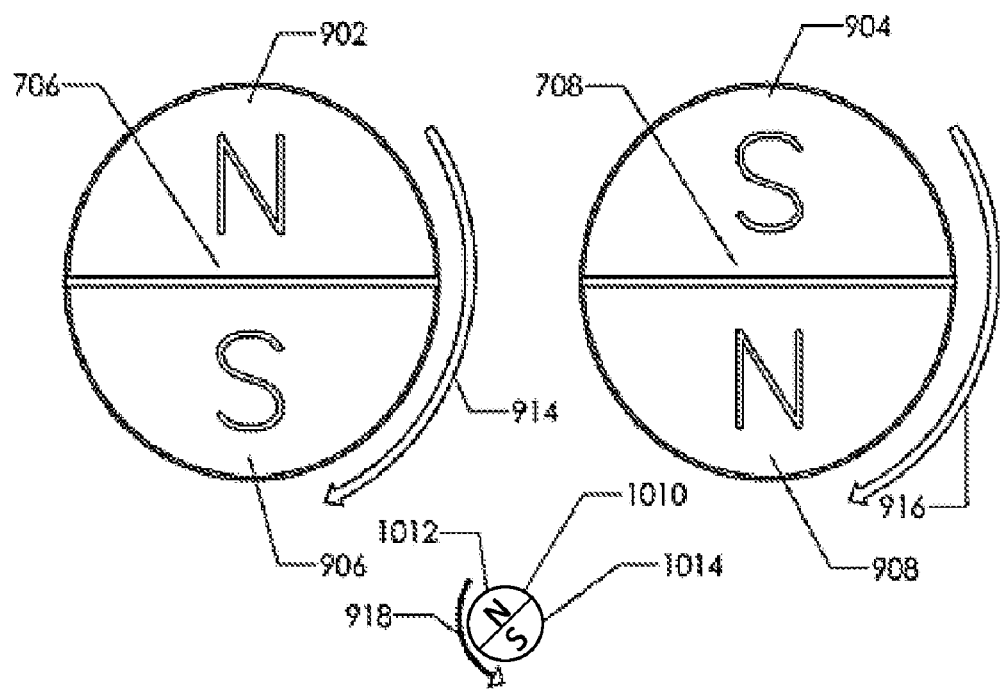
FIG. 5 schematically illustrates the orientation of the magnets of the external adjustment device while driving an implanted magnet of an expandable implant.

FIG. 5 illustrates the orientation of poles of the first and second external magnets 706, 708 and the internal magnet 1010 of the expandable implant 1000 during a distraction procedure. For the sake of description, the orientations will be described in relation to the numbers on a clock. First external magnet 706 is turned (by gearing, belts, etc.) synchronously with second external magnet 708 so that north pole 902 of first external magnet 706 is pointing in the twelve o'clock position when the south pole 904 of the second external magnet 708 is pointing in the twelve o'clock position. At this orientation, therefore, the south pole 906 of the first external magnet 706 is pointing is pointing in the six o'clock position while the north pole 908 of the second external magnet 708 is pointing in the six o'clock position. Both first external magnet 706 and second external magnet 708 are turned in a first direction as illustrated by respective arrows 914, 916. The rotating magnetic fields apply a torque on the internal magnet 1010 of the expandable implant 1000, causing it to rotate in a second direction as illustrated by arrow 918. Exemplary orientation of the north pole 1012 and south pole 1014 of the internal magnet 1010 during torque delivery are shown in FIG. 5. When the first and second external magnets 706, 708 are turned in the opposite direction from that shown, the internal magnet 1010 will be turned in the opposite direction from that shown. The orientation of the first external magnet 706 and the second external magnet 708 in relation to each other serves to optimize the torque delivery to the implanted magnet 1010.

Now, it has been shown that monitoring the rotation of the external magnets 706, 708 can give insight into an amount of rotation of the internal magnet 1010 of the expandable implant 1000. However, the external magnets 706, 708 may become decoupled from the internal magnet 1010, at least temporarily, and while the external magnets 706, 708 rotate the internal magnet 1010 of the expandable implant 1000 may not. This is sometimes referred to as slippage or stalling, and may result in inaccurate monitoring of a total amount of adjustment of the expandable implant 1000.

Figure 6:
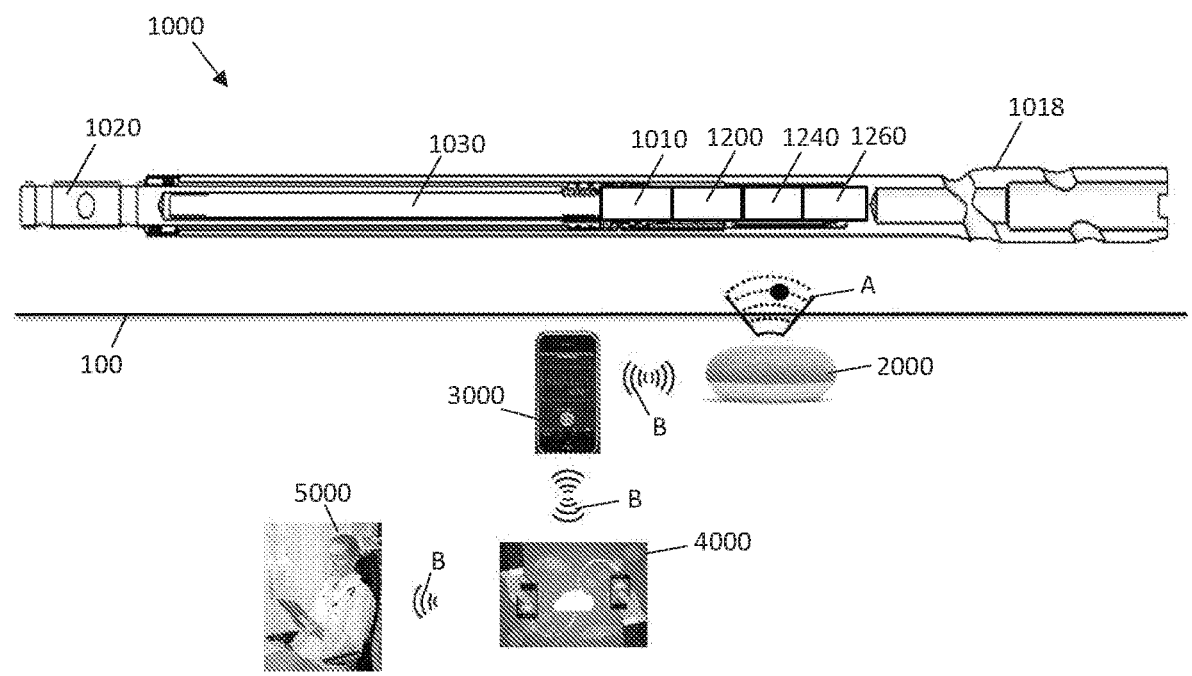
FIG. 6 shows a schematic view of an expandable implant having an ultrasound counter implanted within a patient.

FIG. 6 shows a schematic view of an expandable implant 1000 implanted within a patient 100, the expandable implant 1000 having an ultrasound counter 1200 disposed therein. The expandable implant 1000 includes a housing 1018 and a rod 1020 configured to move telescopically relative to the housing 1018. The rod 1020 includes a threaded surface configured to communicate with a lead screw 1030. As described above, upon a rotation of the lead screw 1030 by the rotatable internal magnet 1010, the rod 1020 will move relative to the housing 1018.

Adjacent to the internal magnet 1010 is an ultrasound counter 1200. The ultrasound counter 1200 is configured to generate at least one ultrasound transmission upon, for example, each rotation of the lead screw 1030. The expandable implant 1000 also is shown including an ultrasound transducer 1240 operably coupled to an electronics module 1260.

The ultrasound transducer 1240 is configured to send and/or receive ultrasound transmissions A. Now, as described herein, in some embodiments the ultrasound counter 1200 is configured to generate ultrasound transmissions A corresponding to an amount of adjustment of the expandable implant 1000. The ultrasound transmissions A may be observed locally at the expandable implant 1000 by the ultrasound transducer 1240. The electronics module 1260 operatively and electronically coupled to the ultrasound transducer 1240 may include one or more of: a controller, a memory, a power supply, and any other electronic component, with the ultrasonic transducer 1240 configured to count a number of ultrasonic transmissions A produced by the ultrasound counter 1200.

In some embodiments, the ultrasound transmissions A may be observed external to the patient 100 by an external ultrasound transducer 2000. The external ultrasound transducer 2000 may be part of an external remote control (ERC) 700 of the expandable implant 1000, and may be a separate device 2000. The external ultrasound transducer 2000 may be in communication with one or more various electronic devices, for e.g. a smart phone 3000 across various communication bands B including: R F, WiFi, Bluetooth, Internet, ultrasound communication and any known communication method. One or more of the external ultrasound transducer 2000, the smart phone 3000, and any known electronic device may be connected to the internet 4000 e.g. a cloud 4000. This allows a practitioner 5000 to remotely receive distraction information from the expandable implant 1000, by remotely accessing and even adjusting the expandable implant 1000.

Figure 7:
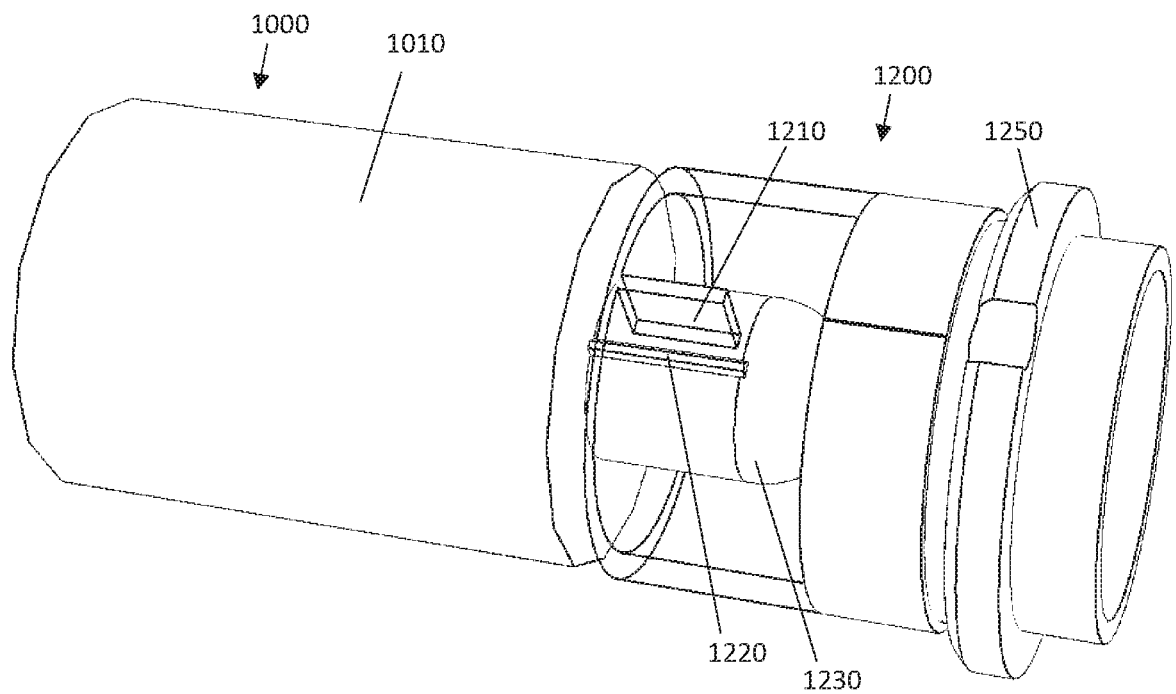
FIG. 7 shows an ultrasound counter in accordance with a first embodiment.

FIG. 7 shows an ultrasound counter 1200 in accordance with a first embodiment. As one with skill in the art may appreciate, the ultrasound counter 1200 is designed for integration with expandable implants 1000 including those described above, at least a portion of the ultrasound counter 1200 may be disposed for example in the housing 1018 of the expandable implant 1000 adjacent to the internal magnet 1010. The ultrasound counter 1200 includes at least one vibration element 1210 tuned for ultrasonic vibration. For convenience, a portion of the vibration element 1210 is shown transparent to illustrate the communication between the vibration element 1210 and an agitation element 1220 disposed on the rotatable shaft 1230. The shaft 1230 is shown in communication with the internal magnet 1010 of an expandable implant 1000 and is configured to rotate upon a rotation of the rotatable permanent magnet 1010.

The vibration element 1210 is tuned to produce an ultrasonic transmission, e.g. a vibration at an ultrasonic frequency, upon an agitation by the agitation element 1220. A rotation of the internal permanent magnet 1010, which occurs upon activation by an external remote control 700 as described above, will be communicated to the rotatable shaft 1230, and the agitation element 1220 will communicate with the vibration element 1210 to produce a transmission at an ultrasonic frequency.

Each rotation of the shaft 1230 will correlate to a rotation of the internal magnet 1010. Rotation of the internal magnet 1010 will also correlate to some fixed amount of adjustment of the expandable implant 1000. Therefore, each ultrasonic transmission produced by the vibration element 1210 will correspond to a quantified amount of adjustment of a total length of the expandable implant 1000.

Figure 8:
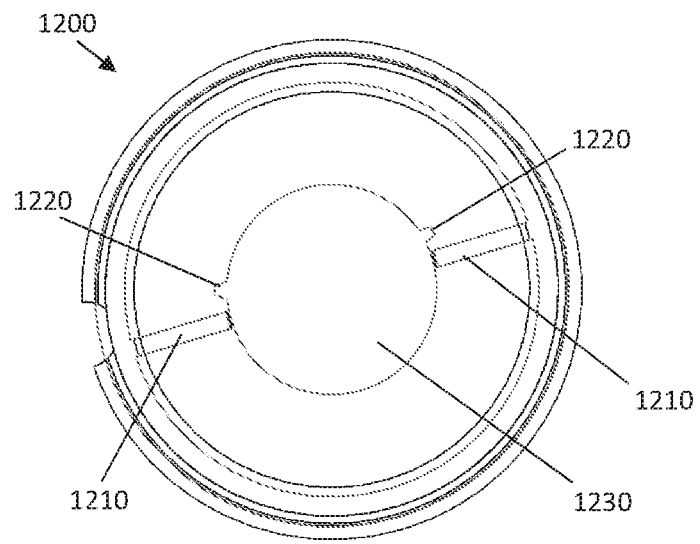
FIG. 8 shows a cross-sectional view of the ultrasound counter in accordance with the first embodiment.

FIG. 8 shows a cross-sectional view of the ultrasound counter 1200 in accordance with the first embodiment. The rotatable shaft 1230 is shown having a plurality of agitation elements 1220 disposed thereon. The ultrasound counter 1200 is also shown including a plurality of vibration elements 1210.

One distinct advantage of this design is that generation of the ultrasound transmissions is purely mechanical. This is advantageous in expandable implants because no power is required to produce the transmissions. The energy required can be harvested from the drive mechanism used to adjust the expandable implant. Energy harvesting, storage and depletion are notable problems in non-invasively expandable implants.

Figure 9:
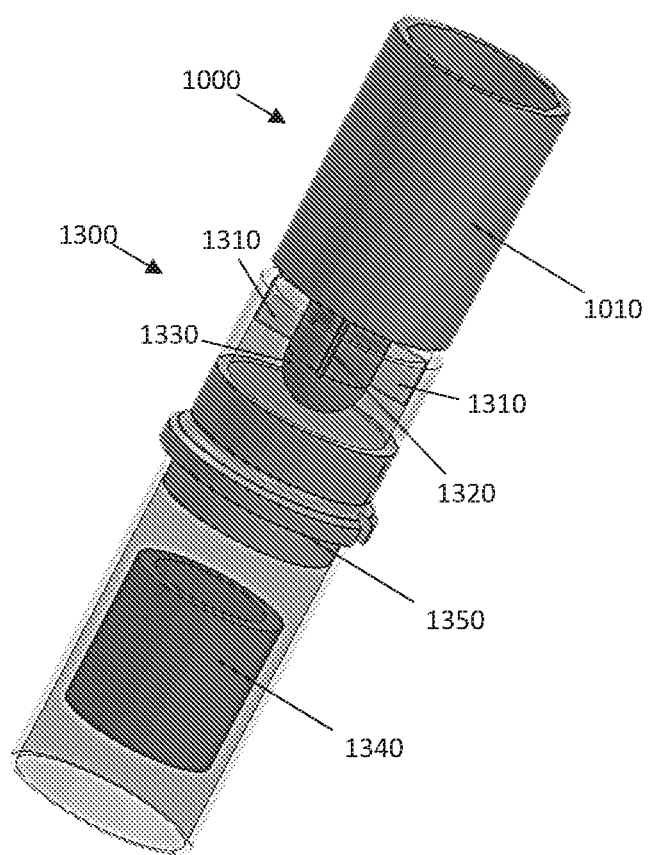
FIG. 9 shows a perspective view of an ultrasound counter in accordance with a second embodiment including an ultrasonic transducer.

FIG. 9 shows a perspective view of an ultrasound counter 1300 in accordance with a second embodiment, including an ultrasonic transducer 1340. As one with skill in the art may appreciate, the ultrasound counter 1300 is designed for integration with expandable implants 1000 including those described above. The ultrasound counter 1300 includes at least one vibration element 1310 tuned for ultrasonic vibration and at least one agitation element 1320. For convenience, a portion of the ultrasound counter 1300 is shown transparent to illustrate the communication between the vibration element 1310 and the agitation element 1320. The agitation element 1320 is shown disposed on a rotatable shaft 1330. The rotatable shaft 1330 is shown in communication with the internal magnet 1010 of an expandable implant 1000.

The resulting ultrasonic transmissions of the vibration element 1310 may be observed locally at the expandable implant 1000 by the ultrasonic transducer 1340. The ultrasonic transducer 1340 is shown disposed on the ultrasound counter 1300, but in some embodiments may be part of and disposed adjacent to the expandable implant 1000. The ultrasonic transducer 340 is operably connected to an electronics module 1360 including one or more of: a controller, a memory, a power supply, or any other electronic component, with the ultrasonic transducer 1340 configured to count a number of ultrasonic transmissions produced by the vibration element 1310.

Figure 10:
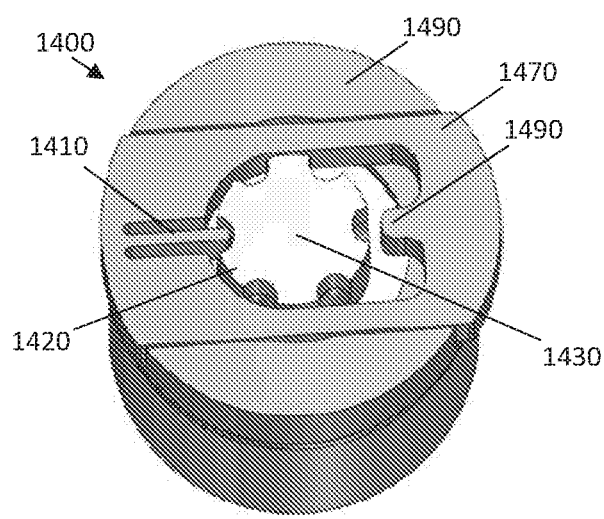
FIG. 10 shows a cross-sectional view of an ultrasound counter in accordance with a third embodiment.
Figure 11:
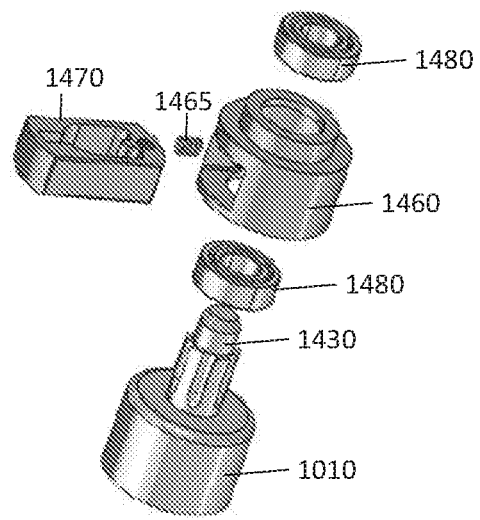
FIG. 11 shows an exploded view of the ultrasound counter in accordance with the third embodiment.

FIG. 10 shows a cross-sectional view of an ultrasound counter 1400 in accordance with a second embodiment. In this embodiment, the ultrasound counter 1400 includes a plate 1470 having a vibration element 1410 and an anti-rotation element 1490. As illustrated in the exploded view of FIG. 11, the plate 1470 is configured to be telescopically received in a housing 1460. And the plate 1470 is configured to receive at least a portion of a shaft 1430 therethrough, with the shaft 4130 shown including a plurality of agitation elements 1420. The plate 1470 is configured to be moved telescopically within the resonator housing 1460.

The plate 1470 can change configuration upon a rotation of the shaft 1430. For example in a first configuration configured to lock and prevent undesired rotation of the shaft 1430, the anti-rotation element 1490 will be in contact with the agitation element 1420, with communication between the anti-rotation element 1490 and the agitation element 1420 configured to prevent a rotation of the shaft 1430. In a second configuration for monitoring adjustment of an expandable implant 1000, the vibration element 1410 will be in communication with the agitation element 1420, and the anti-rotation element 1490 will not be in communication with the agitation element 1420. The ultrasound counter 1400 includes a bias element 1465 configured to bias the plate 1470 in the first configuration.

The shaft 1430 is configured to be operably coupled to a drive system 1010 of an expandable implant 1000, the drive system 1010 including for example the rotatable permanent magnet 1010 of the expandable implant 1000 as shown above. In some embodiments the shaft 1430 may be configured to prevent undesired rotation of the drive system when in the locked configuration. And in some embodiments the drive system may include: an electronic motor, a pneumatic motor, and any actuator known and used in implants.

Now, with the plate 1470 in the first configuration, upon an application of sufficient torque a rotation of the permanent magnet 1010 will induce a rotation of the shaft 1430. With the sufficient torque the bias element will yield and the plate will move from the first configuration into the second configuration. The vibration element 1410 is configured to communicate with the plurality of agitation elements 1420 to produce an ultrasonic transmission. As described above, these transmissions may be observed locally at the expandable implant 1000 or may be observed outside of the patient by an external transceiver.

The ultrasound counter 1400, further includes a pair of thrust bearings 1480 configured to minimize an amount of axial force place on ultrasound counter 1400. Mitigation of axial forces is helpful in maintaining a specific frequency of the ultrasonic transmissions produced by the vibration element 1410.

Now as one with skill in the art may appreciate, the vibration elements of the embodiments described above are tuned to a ultrasound frequency such that upon agitation by the agitation element, the vibration element will produce a vibration at an ultrasound frequency. Generally, this frequency is between 20 kHz-200 MHz and above. The current embodiments have been tuned to approximately 50 kHz.

When observing the signal produced by the vibration element at 50 kHz, noise may be produced by every component of the expandable implant. In some embodiments, a load cell 1250, 1350 may be included to measure axial forces on the expandable implant. Measuring the axial forces can help filter the noise floor when observing the ultrasound signal produced by the vibration element at 50 kHz.

Also, in some embodiments the agitation elements can be disposed on a rotatable magnet and the vibration elements may be configured to communicate with the agitation elements disposed on the rotatable magnet upon a rotation of the rotatable magnet.

In some embodiments, the actuator may be a rotatable magnet, an electric motor, or any actuator known and used in the art to actuate expandable implants.

In some embodiments, adjustment of the expandable implant may result in motion of a surface of the expandable implant. The expandable implant may include one or more vibration element configured to vibrate upon an adjustment of the expandable implant. For example, if the motion is linear, one or more agitation element may be disposed on a first surface and one or more vibration elements may be disposed on a second surface. Upon, a movement of the first surface relative to the second surface, the one or more vibration element will communicate with the one or more agitation element to produce ultrasound vibrations. The vibration elements and/or agitation elements may be disposed such that each vibration corresponds to a given amount of displacement of the first surface relative to the second surface.

An embodiment of a method for measuring a change in dimension of an implant using ultrasound includes the steps: (i.) Providing an expandable implant having an agitation element configured to move upon an adjustment of the expandable implant and a vibration element tuned for ultrasonic vibration, the vibration element configured to produce an ultrasonic vibration upon an agitation by the agitation element. (ii.) Adjusting the expandable implant. (iii.) Counting a total number of ultrasonic vibrations produced by the vibration element. (iv.) Calculating a change in dimension from the total number of vibrations produced by the vibration element.

Figure 12:
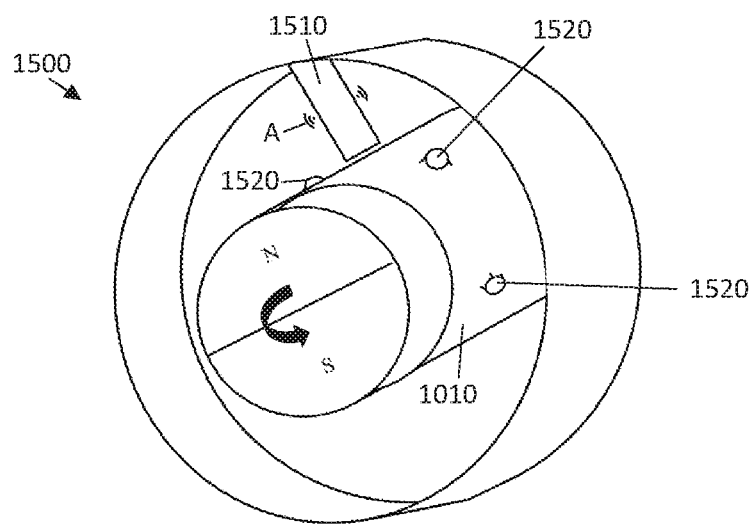
FIG. 12 shows an ultrasound counter in accordance with a third embodiment, the ultrasound counter configured to produce an ultrasound transmission upon an adjustment of an expandable implant.

FIG. 12 is a schematic illustration of an ultrasound counter 1500 in accordance with a third embodiment, the ultrasound counter 1500 configured to produce an ultrasound transmission upon an adjustment of an expandable implant. The ultrasound counter 1500 is configured to be integrated with an expandable implant. The ultrasound counter 1500 includes a vibration element 1510. The vibration element 1510 is configured to communicate with a surface of the internal magnet 1010 of the expandable implant 1000. In some embodiments, the internal magnet 1010 includes one or more agitation element 1520 disposed on the surface thereof, the agitation elements 1520 configured to agitate the vibration element 1510 to produce an ultrasound transmission A.

Each ultrasound transmission A will correlate with an amount of rotation of the internal magnet 1010. By counting a number of ultrasound transmissions A, either locally at the implant or remotely outside of the patient as described above, one can determine an amount of adjustment of the expandable implant 1000.

Figure 13:
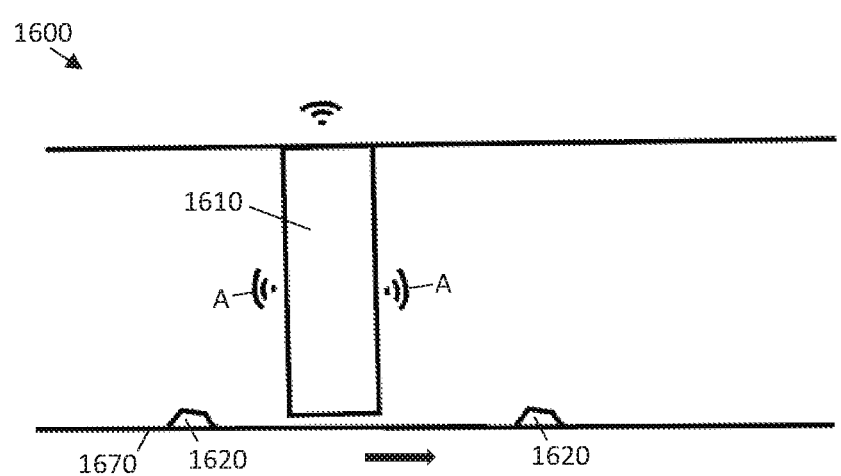
FIG. 13 shows an ultrasound counter in accordance with a fourth embodiment, the ultrasound counter configured to produce an ultrasound transmission upon linear movement of an adjacent surface.

FIG. 13 is a schematic illustration of an ultrasound counter 1600 in accordance with a fourth embodiment, the ultrasound counter 1600 configured to produce an ultrasound transmission A upon linear movement of an adjacent surface 1670 of an expandable implant 1000. In some embodiments of expandable implants, linear movement instead of rotation movement is used to adjust the expandable implants. The vibration element 1610 will communicate with a moving surface 1670 of the expandable implant 1000 to produce an ultrasound transmission (ultrasound signal) A upon a movement of the surface 1670. The surface 1670 may include one or more agitation elements to communicate with the vibration element 1610.

Each ultrasound transmission A will correlate with an amount of movement of the surface 1670. By counting a number of ultrasound transmissions A, either locally at the implant or remotely outside of the patient as described above, one can determine an amount of adjustment of the expandable implant 1000.

In some embodiments, expandable implants may include: expandable cages, expandable rods, expandable plates, and any medical implant known and used in the art of expandable medical devices.

Now, the foregoing description of the exemplary embodiments has been presented only for the purposes of illustration and description and is not intended to be exhaustive or to limit the systems to the precise forms disclosed. Many modifications and variations are possible in light of the above teaching. The embodiments were chosen and described in order to explain the principles of the systems and their practical application so as to enable others skilled in the art to utilize the systems and various embodiments and with various modifications as are suited to the particular use contemplated. Alternative embodiments will become apparent to those skilled in the art to which the present systems pertain without departing from their spirit and scope.

What is claimed is:

1. An expandable implant comprising:
   a plurality of vibration elements tuned for ultrasonic vibration, the vibration elements configured to produce the ultrasonic vibration upon an adjustment of the expandable implant;
   an agitation element including a plurality of bumps disposed on a shaft and configured to communicate with the vibration elements to produce the ultrasonic vibration upon the adjustment of the expandable implant.

2. The expandable implant of claim 1, further comprising the shaft, with the agitation element disposed on the shaft and configured to communicate with the vibration elements upon a rotation of the shaft.

3. The implant of claim 1, the agitation element comprising a rotatable permanent magnet.

4. The implant of claim 3, the rotatable permanent magnet further comprising the plurality of bumps configured to communicate with the vibration elements.

5. The implant of claim 1, further comprising an ultrasound transducer configured to count a total number of the ultrasonic vibrations produced by the vibration elements.

6. The implant of claim 5, wherein the vibration elements are positioned such that the total number of the ultrasonic vibrations produced by the vibration elements corresponds to an amount of change of a dimension of the implant.

7. An implant comprising:
   a housing configured to be secured to a first portion of bone of a patient;
   a rod configured for telescopic engagement with the housing, the rod configured to be secured to a second portion of the bone of a patient;
   a plurality of vibration elements tuned for ultrasonic vibration;
   an agitation element comprising a shaft having a plurality of bumps configured to communicate with the vibration elements upon a rotation of the shaft;
   wherein the agitation element is configured to rotate as the rod moves relative to the housing; and wherein the rotation of the agitation element is configured to communicate with the vibration elements to produce the ultrasonic vibration.

8. The implant of claim 7, further comprising a piezoelectric transducer configured to count a total number of the ultrasonic vibrations produced by the vibration elements.

9. The implant of claim 8, wherein the vibration elements are positioned such that the total number of the ultrasonic vibrations produced by the vibration elements corresponds to a total amount of movement of the rod relative to the housing.

10. The implant of claim 7, the agitation element comprising a rotatable magnet.

11. The implant of claim 10, the rotatable magnet further comprising the plurality of bumps configured to communicate with the vibration elements.

12. The implant of claim 7, wherein a total of the number of ultrasonic vibrations corresponds to a change in length of the implant.

13. The implant of claim 7, wherein a total of the number of ultrasonic vibrations corresponds to a change in height of the implant.

14. The implant of claim 7, wherein a total of the number of ultrasonic vibrations corresponds to a change in width of the implant.

* * * * *